United States Patent
Adams et al.

(10) Patent No.: US 6,974,061 B2
(45) Date of Patent: Dec. 13, 2005

(54) CONTROL MODULE FOR FLYWHEEL OPERATED HAND TOOL

(75) Inventors: Shane Adams, Lebanon, OH (US); Conrad Garvis, Mason, OH (US); Richard Leimbach, Cincinnati, OH (US)

(73) Assignee: Senco Products, Inc., Cincinnati, OH (US)

( * ) Notice: Subject to any disclaimer, the term of this patent is extended or adjusted under 35 U.S.C. 154(b) by 0 days.

(21) Appl. No.: 10/896,813

(22) Filed: Jul. 22, 2004

(65) Prior Publication Data

US 2005/0040206 A1 Feb. 24, 2005

Related U.S. Application Data

(62) Division of application No. 10/027,767, filed on Dec. 20, 2001, now abandoned.

(60) Provisional application No. 60/258,022, filed on Dec. 22, 2000.

(51) Int. Cl.$^7$ .............................. B25C 1/06; B25C 1/00
(52) U.S. Cl. ........................................... 227/2; 227/131
(58) Field of Search ........................... 227/2, 131, 129, 227/133

(56) References Cited

U.S. PATENT DOCUMENTS

| | | |
|---|---|---|
| 3,641,410 A | 2/1972 | Vogelsberg |
| 4,042,036 A | 8/1977 | Smith et al. |
| 4,121,745 A | 10/1978 | Smith et al. |
| 4,179,644 A | 12/1979 | Vassos |
| 4,204,622 A | 5/1980 | Smith et al. |
| 4,292,571 A | 9/1981 | Cuneo |
| 4,298,072 A | 11/1981 | Baker et al. |
| 4,540,318 A | 9/1985 | Hornung et al. |
| 4,679,719 A | 7/1987 | Kramer |
| 5,014,793 A | 5/1991 | Germanton et al. |
| 5,154,242 A | 10/1992 | Soshin et al. |
| 5,511,715 A | 4/1996 | Crutcher et al. |
| 5,732,870 A | 3/1998 | Moorman et al. |
| 5,894,095 A | 4/1999 | DeMali |
| 5,918,788 A | 7/1999 | Moorman et al. |
| 5,927,585 A | 7/1999 | Moorman et al. |
| 6,059,806 A | 5/2000 | Hoegerle |

FOREIGN PATENT DOCUMENTS

| | | |
|---|---|---|
| EP | 0546834 A1 | 10/1992 |
| EP | 0662750 A1 | 5/1995 |

Primary Examiner—Scott A. Smith
Assistant Examiner—Brian Nash
(74) Attorney, Agent, or Firm—Frost Brown Todd LLC

(57) ABSTRACT

A control module advantageously reduces cost and enhances reliability, design flexibility, ease of assembly, and performance of a flywheel operated hand tool. The control module includes a thin film printed circuit with non-contact speed sensing of a flywheel to more accurately set the target speed and control transfer kinetic energy thereof to a fastener, achieving a desired depth regardless of variations in component performance and battery voltage. The printed circuit also includes long service life thin film switches for responding to trigger and safety inputs. Furthermore, the control module responds to a user speed selection and to preset speed selection ranges to reconfigure the controls as appropriate to constraints of a fastener drive assembly and to user preferences.

18 Claims, 27 Drawing Sheets

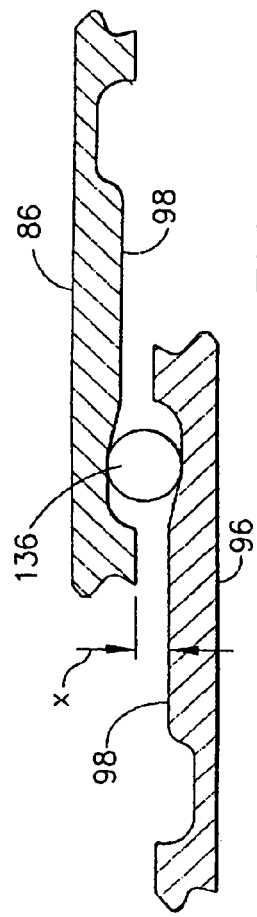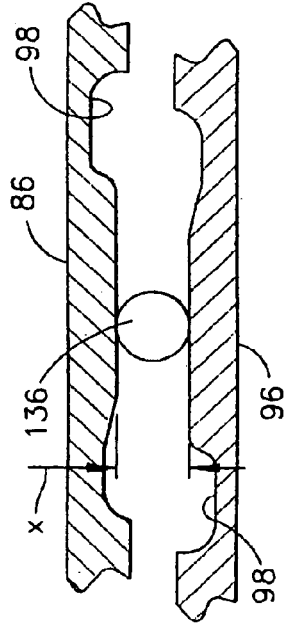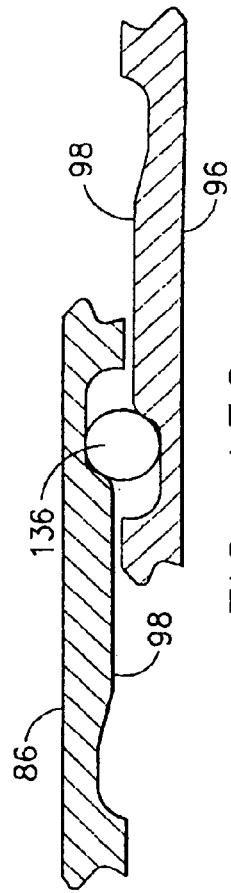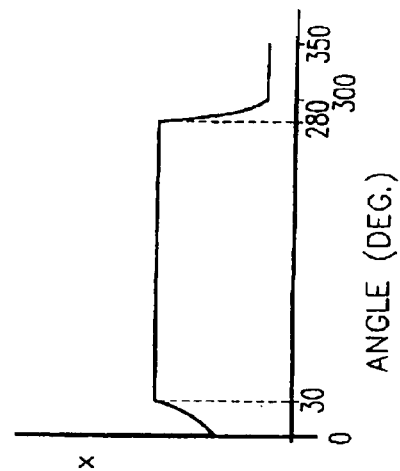
FIG. 13A
FIG. 13B
FIG. 13C
FIG. 14

Pulse Width Modulation Section
on-time 2usec. to 510usec. in single step increments
off-time 520usec. to 10usec. in single step decrements t2 − t3 = 2us
t3 − t4 = 520us
t4 − t5 = 3us
t5 − t6 = 519us t7 − t8 = 509us
t8 − t9 = 11us
t9 − t10 = 510us
t10 − t11 = 10us t11 = full on

CONTROL MODULE FOR FLYWHEEL OPERATED HAND TOOL

CROSS REFERENCE TO RELATED APPLICATIONS

This application is a divisional of U.S. Non-Provisional Patent Application Ser. No. 10/027,767, filed Dec. 20, 2001, now abandoned, entitled CONTROL MODULE FOR FLYWHEEL OPERATED HAND TOOL.

This application claims the priority of Provisional Patent Applicant Ser. No. 60/258,022, filed on Dec. 22, 2000 and incorporates herein, by reference, the totality of the invention disclosure therein.

This application is related to three commonly-owned, co-pending U.S. non-provisional patent applications filed on even date herewith and respectively titled, "FLYWHEEL OPERATED TOOL" to Conrad Gravis, et al; "FLYWHEEL OPERATED NAILER" to John Burke, et al; and "RETURN MECHANISM FOR A CYCLICAL TOOL" to Kevin Harper, et al. This application further relates to the commonly-owned, co-pending U.S. non-provisional patent application to Shane Adams, et al., filed on even date herewith and titled "SPEED CONTROLLER FOR FLYWHEEL OPERATED HAND TOOL".

FIELD OF THE INVENTION

This invention generally relates to a hand-held electromechanical fastener driving tool, and more particularly to a fastener driving tool having an inertial member for imparting kinetic energy to drive a fastener into a work piece.

BACKGROUND OF THE INVENTION

In the past, where relatively large energy impulses have been required to operate a fastener driving tool, such as an industrial nailer or stapler, it has been common practice to power such tool pneumatically. Such tools are capable of driving a 3" or longer nail, or staple, into framing wood such as 2×4s, for example. However, pneumatic driving tools require an on-site air compressor, which is often unavailable or not desired. Also, dragging the pneumatic umbilical is often an impediment to the user.

Corded AC electrical fastener driving tools are often used instead of pneumatic power since electrical power is more often available than air compressors. In particular, much effort has been expended in the prior art in providing heavy duty, high powered, fastener driving tools employing a flywheel as a means of delivering kinetic energy sufficient to drive a heavy duty fasteners. Examples of such systems are disclosed in U.S. Pat. Nos. 4,042,036; 4,121,745; 4,204,622; 4,298,072; and 5,511,715. Use of a flywheel is an attempt to limit the large current draws to actuate a solenoid to drive a fastener. A DC motor is activated over a non-instantaneous period and then the kinetic energy thus developed in the flywheel is clutched to the driver in an "energy dump".

While such corded electrical fastener driving tools may perform well, in many instances an AC outlet is not available. Even if an AC outlet is available, many users find dragging the electrical cord to be an impediment to use. To address these preferences, it is further known to employ a portable power source such as a battery, such as solenoid-operated fastener driving tools. These portable fastener driving tools are primarily used in light-duty applications such as in driving one inch brad nails, for example, rather than the larger 2" to 4" staples or nails used in framing.

One approach to an efficient portable electrically driven tool is a multiple impact tool, such as described in U.S. Pat. No. 4,625,903, wherein a linear inertial member is repeatedly raised by a cam against a compression spring and released to impact a fastener. An electrical motor and portable battery pack are operated in a more efficient manner by running the motor for a period of time rather than providing a surge of power to a device such as a solenoid. The relatively small amount of energy stored in the spring each cycle typically requires a large number of impacts to drive a staple or nail into a workpiece. During this time, the user is required to maintain an appropriate position and force on the fasten and to gauge the appropriate length of time to achieve the desired depth. However, while the multiple impact tool is efficient and effective in driving fasteners, some users prefer a single driving action comparable to pyrotechnic or compressed air systems. The multiple impact tools also can damage a wood surface due to the vibrations the tool generates while stroking.

It would be desirable to use a battery to power a flywheel operated hand tool to provide a portable fastener driver that can drive larger fasteners in a single drive. However, using a battery has been thwarted by a number of challenges. First, each specific application generally requires a fastener drive assembly and motor customized for the type of fastener. In particular, the size of flywheel, the desired rotary speed of the flywheel, and the type of electric motor to accelerate the flywheel to the desired rotary speed are generally specifically sized for the type of fastener and work piece into which the fastener is typically driven. Thus, each specific application was thought to require a custom control module, with the increased costs of design, manufacture and support.

Even assuming that various types of fasteners could then be used with a family of flywheel operated hand tools, each tool would suffer the disadvantages inherent in using battery power. The battery voltage varies as a function of the amount of charge remaining and the amount of electrical current being drawn. The rotary speed of the flywheel varies with the battery voltage, and thus the depth of drive of the fastener would unacceptably vary. The generally known controllers for corded flywheel operated hand tools are unable to accommodate these power variations.

Furthermore, even for a specific application, the desired depth of drive is affected by the type of work piece into which the fastener is driven and to user preferences. However, flywheel operated hand tools rely upon a given amount of kinetic energy imparted by the flywheel to achieve a desired depth of travel. Thus, when the work piece is more or less dense, the depth of the drive will vary. Moreover, the user may prefer in some instances to sink the fastener below the plane of the work piece or to leave the head of the fastener exposed for easy removal.

Other types of hand tools, such a pneumatic powered hand tools, generally rely on driving the fastener to a specific position in order to achieve a desired depth. For example, in U.S. Pat. Nos. 4,679,719, 5,732,870 and 5,918,788 a control module is described that advantageously determines the mode of operation for the trigger. In particular, a microprocessor provided additional capabilities by receiving two signal inputs initiated by the user and by selectively activating an electronic solenoid in response thereto. Although the increased functionality of the control module in such pneumatic tools has advantages, these control modules are not responsive to changes in operating conditions to vary the depth of drive.

Other tools employing a rotary member (e.g., drill) generally require the user to determine the proper speed of the tool. The user provides the closed loop control of the tool, monitoring the tool for binding and proper operation and depressing the trigger an appropriate amount. However, consistent operation of the tool is thus dependent upon the skill level and attentiveness of the user. Due to the speed in which a fastener must be driven into the workpiece, the user would only learn after the fact whether the rotary member (in this case a flywheel) was accelerated to an appropriate speed prior to firing.

Therefore, a significant need exists for a control module that drives medium and large fasteners into a work piece with a single driving action, yet has the increased portability of battery power. It would be further desired to have such a tool that consistently provides a depth of fastener regardless of the state of charge of the battery. It would be yet further desired to have a control module readily adapted to a family of hand tools.

BRIEF SUMMARY OF THE INVENTION

These and other problems in the prior art are addressed by a control module that is responsive to a rotary speed of a rotational member of an electrically powered hand tool and is responsive to an adjustable target speed for the rotational member. Thereby, the control module more consistently controls the hand tool, avoiding human error and the inconvenience of relying upon the user to modulate the speed of the tool.

In one aspect of the invention, a control module for a hand tool includes a speed setting that is used for presetting the control module to an operating range of the intended rotational member of the hand tool. Thus, the control module is readily adjusted to the operating environment, using the speed setting as a target for comparing a sensed speed.

In another aspect of the invention, a method of controlling a fastener-driving tool enforces a user input sequence to ensure that a fastener is driven into a workpiece. In particular, a safety signal is received from a safety switch indicating a nose assembly of the tool is against a workpiece. A safety time-out value is accessed. The duration of depression of the safety signal is timed. Then, the tool is activated to drive a fastener in response to receiving a trigger signal from a trigger switch before the timed duration of the safety signal exceeds the safety time-out value. By so enforcing this sequence, a user is less likely to inadvertently drive a fastener in instances where the trigger is inadvertently squeezed and the tool contacts a surface.

In yet another aspect of the invention, an electrically powered hand tool is provided a reliable interface to a control module through use of a thin film switch interface to user controls (e.g., safety and trigger) and through use of noncontact speed sensing.

These and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention, and, together with the general description of the invention given above, and the detailed description of the embodiments given below, serve to explain the principles of the present invention.

FIGS. 13A through 13C present a schematical presentation of the ball/cam action between the fixed plate and the activation plate.

FIG. 14 presents a graph showing the distance x between the fixed plate and the actuation plate as a function of degrees of rotation of the actuation plate.

DETAILED DESCRIPTION OF THE INVENTION

Figure 1:
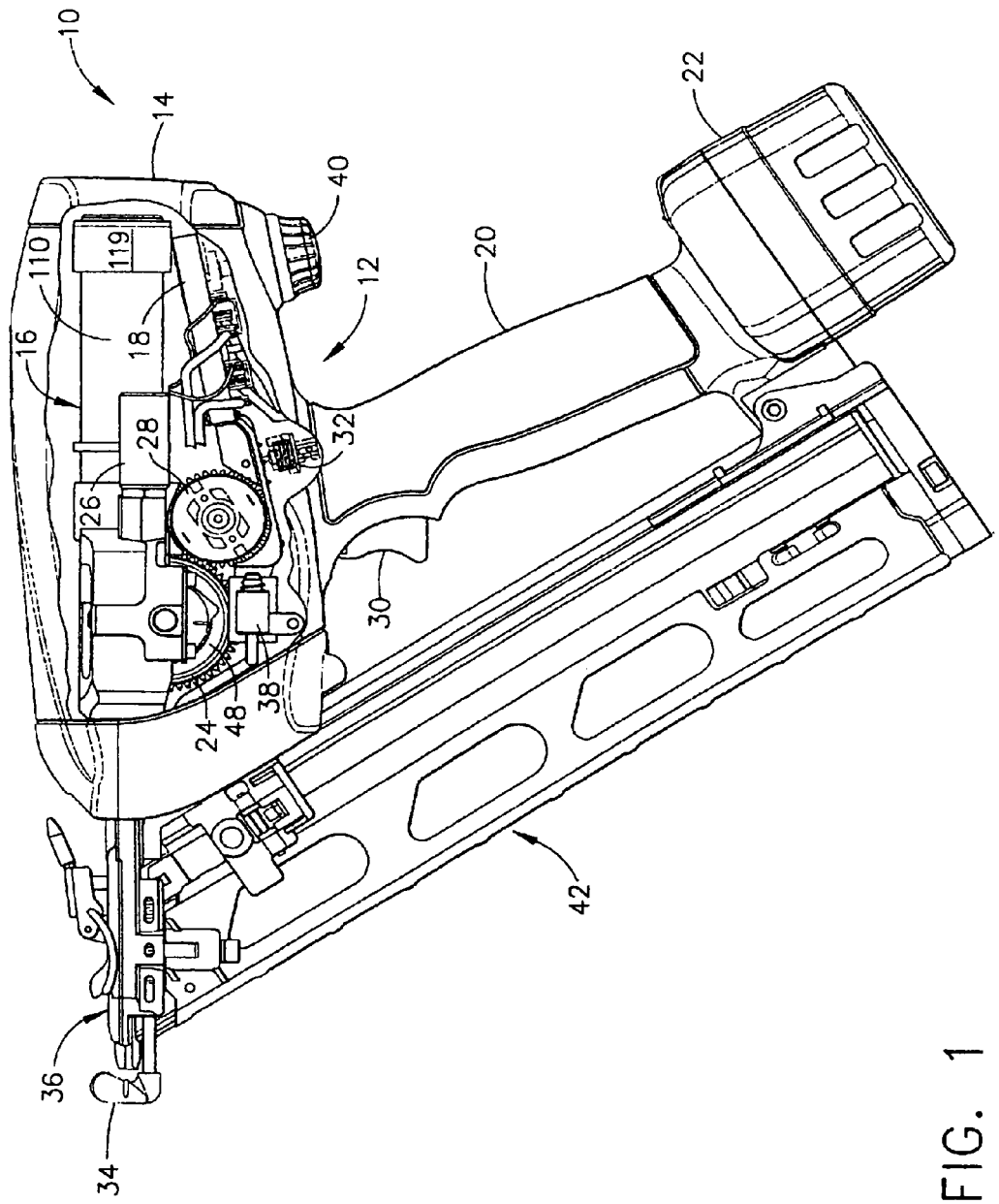
FIG. 1 presents a left side elevational view of a hand held nailing tool, embodying the present invention, having a portion of its left side removed to show the general positioning of a fastener drive assembly and control module.
Figure 1A:
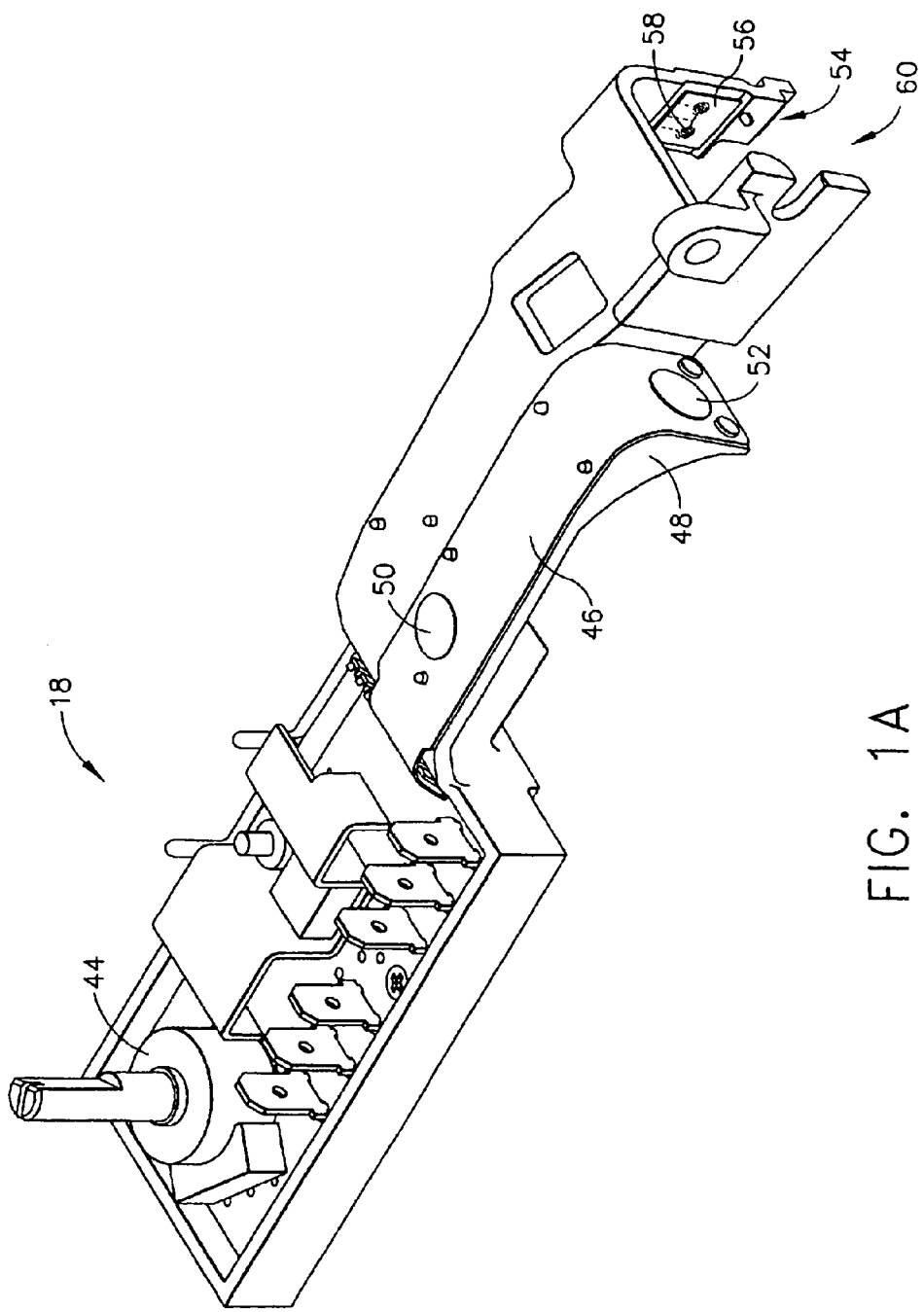
FIG. 1A presents a generally rearward elevated view of the control module of the nailing tool of FIG. 1

With reference to FIG. 1, wherein like numbers refer to like components throughout the several views, a portable flywheel operated hand tool, depicted as a hand-held nailing tool 10, includes a control system 12 that advantageously provides consistent speed control throughout a range of operating conditions. In particular, the nailing tool 10 generally comprises a housing or main body 14 enclosing a fastener drive assembly 16 and a control module 18, and further includes and a gripping handle 20. Attached to the end of handle 20 is a removable, rechargeable battery 22 for providing the necessary electrical energy to operate a DC motor 24 and a solenoid 26 of the fastener drive assembly 16, as well as the electrical control module 18. Unlike generally known batteries that are required to handle large current influxes (e.g., Nickel Cadmium), the present invention advantageously may utilize other types of batteries (e.g., Nickel Metal Hydride (NiMH), lithium Polymers).

The DC motor 24, when accelerated by the control module 18, turns a flywheel 28 to build kinetic energy in the form of rotational inertia. Thereafter, the control module 18 actuates the solenoid 26 in response to user inputs and a sensed parameter of rotational speed of the flywheel 28 to impart the kinetic energy of the flywheel 28 to a fastener, which is described in further detail below A user input to the nailing tool 10 are depicted as a trigger 30 of the handle 20, which mechanically communicates with the control module 18 via a trigger linkage 32. Another user input is depicted as a safety device 34 of a nose assembly 36 that mechanically communicates with the control module 18 via a safety linkage 38. Yet another user input is depicted as a speed adjust knob 40.

The nailing tool 10 includes a fastener supplying magazine assembly 42, which is typically attached to the main body 14 and handle 20, as illustrated, for supplying a strip of fasteners (not shown) to the nose assembly 36. It will be appreciated that the control system 12 may be advantageously operated with different types of magazine assemblies 42 to include different numbers, types and sizes of fasteners. Moreover, the control system 12 advantageously enhances use of indexed magazine assemblies, as will be described in more detail below.

Control Module.

Figure 2:
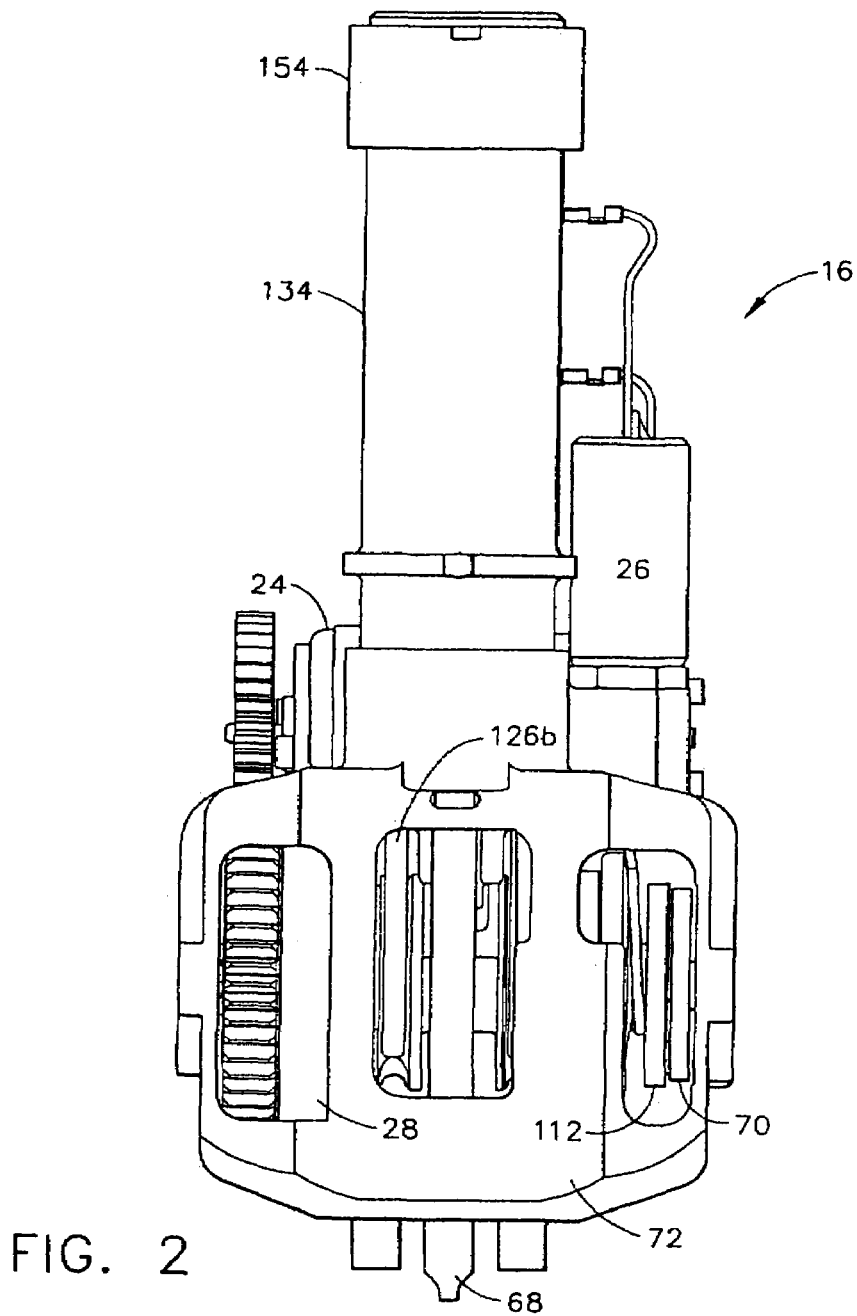
FIG. 2 presents a top view of the fastener drive assembly removed from the main body of the hand held nailing machine as illustrated in FIG. 1.
Figure 3:
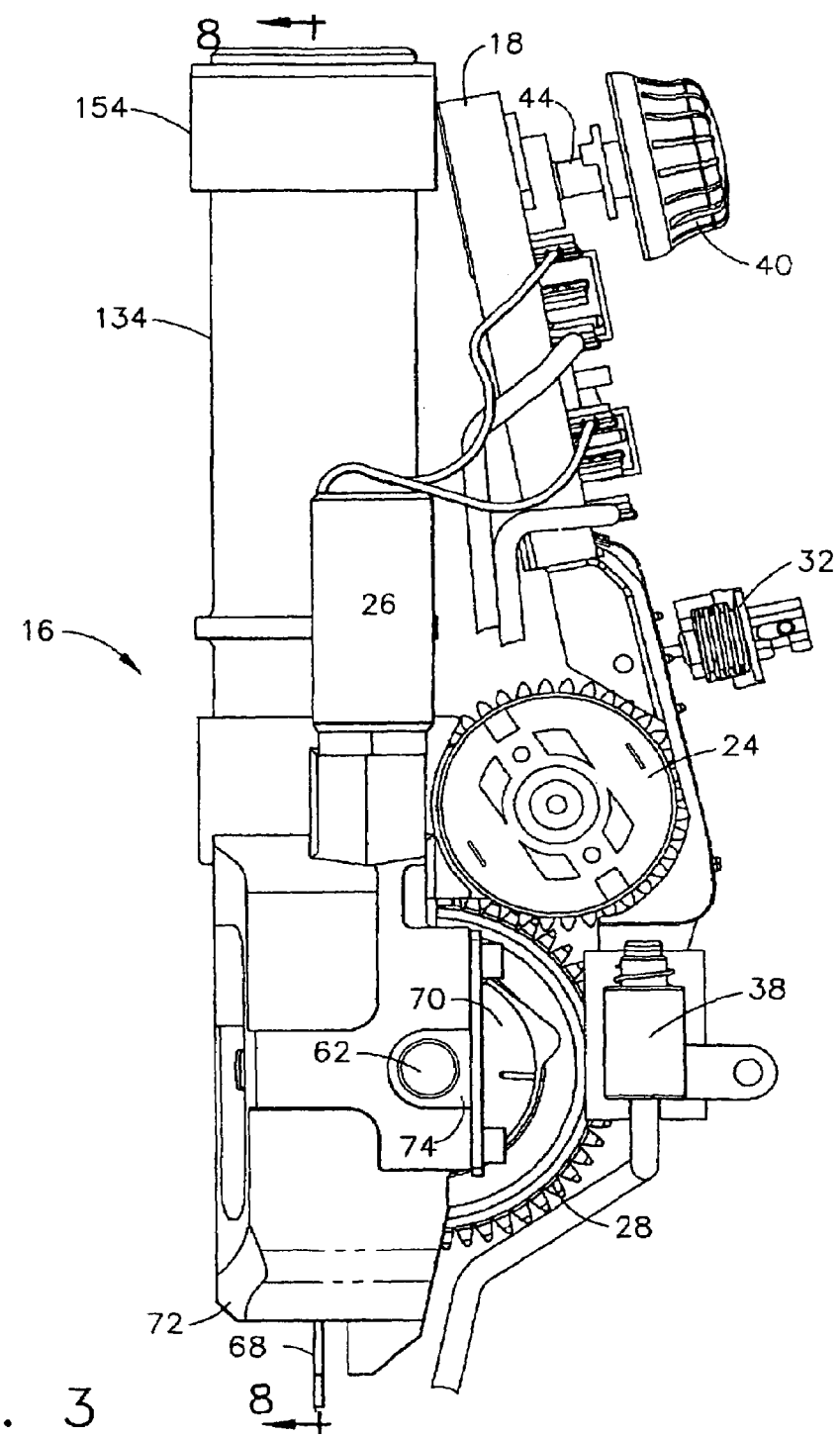
FIG. 3 presents a left side elevational view of the fastener drive assembly as removed from the nailing machine illustrated in FIG. 1.

With reference to FIGS. 1 and 2, the control module 18 of the control system 12 advantageously enhances reliability, design flexibility, ease of assembly, and performance of the nailing tool 10. In particular, the control module 18 includes user speed selection capability, depicted as a potentiometer 44 that is adjusted by knob 40. By being responsive to the user speed adjustment knob 40 enables the nailing tool 10 to adjust a target speed of the flywheel 28. In addition to any preset target speed of the control module 18, the user may adjust the knob 40 to compensate for variations in the workpiece or the desired depth of fastener insertion.

The control module 18 further includes a thin film printed circuit 46 that provides an extremely reliable electrical interface to the mechanical user inputs of the safety device 34 and the trigger 30. Moreover, the printed circuit 46 is readily adapted to various three-dimensional orientations with the support of a molded bridge 48. Thus, a trigger switch 50 and a safety switch 52 are readily positioned to receive the respective trigger and safety mechanical linkages 32, 36. It will be appreciated that thin film switches 50, 52 provide a service life that exceed generally known trigger and safety switches and at a reduced cost.

The molded bridge 48 further supports and orients a portion of the printed circuit 46 that forms a rotary speed transducer 54. Two inductive pickups 56, 58 of the printed circuit 46 are oriented to register to respectively to alternating north and south magnetic poles on a ring magnet (not shown in FIGS. 1 and 2) of the flywheel 28, forming a rotary speed sensor 60. The non-contact nature of the rotary speed sensor 60 avoids degradation due to wear. In addition, by sensing rotary speed directly, the sensor 60 provides an accurate measurement representative of the kinetic energy of the flywheel 28. By contrast, if electrical current drawn by the motor was sensed instead, the resulting measurement may contain variations due to friction, motor component degradation, etc. More accurate speed sensing allows more accurate transfer of kinetic energy to the fastener and thus a more consistent result.

Before discussing the control system 12 in greater, the mechanical aspects of the fastener drive assembly 16 are discussed in greater detail.

Fastener Drive Assembly of the Flywheel Operated Hand Tool

The fastener drive assembly 16 is described that has features of efficiently uses DC electrical power by accelerating the flywheel 28 with the DC motor 24. A clutching technique is advantageously used that avoids the need for a manual reset. In addition, components are described below that advantageously couple to the flywheel during acceleration to increase the inertial load prior to driving the fastener and then disengage after driving the fastener. Furthermore, resetting the fastener drive assembly 16 with a vacuum return approach further conserves electrical power and avoids the generally known techniques that require a manual reset key.

Figure 4:
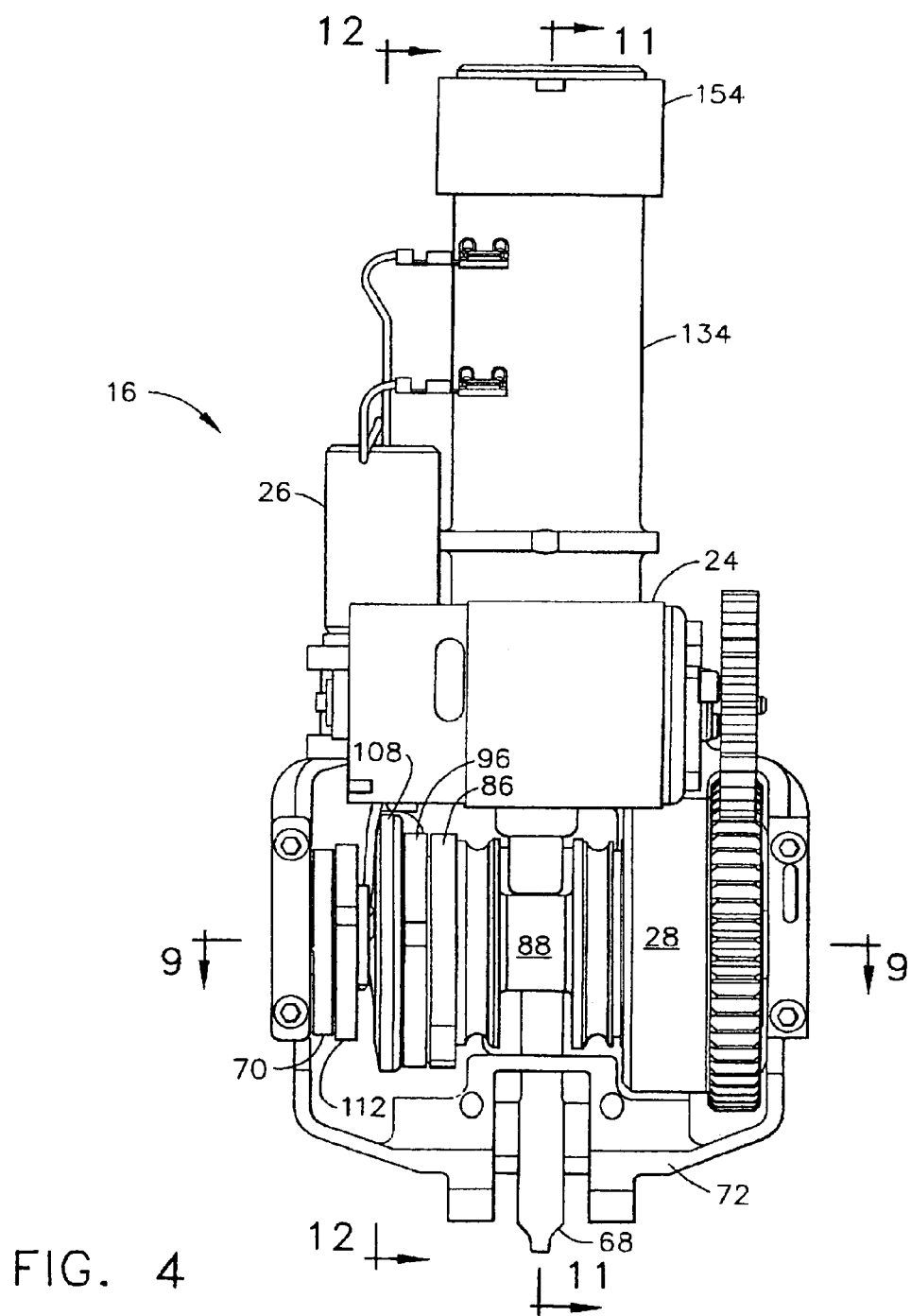
FIG. 4 presents a bottom view, looking upward from the handle of the fastener drive assembly as removed from the nailing machine outer shell illustrated in FIG. 1 and having the electrical control module removed for clarity.
Figure 5:
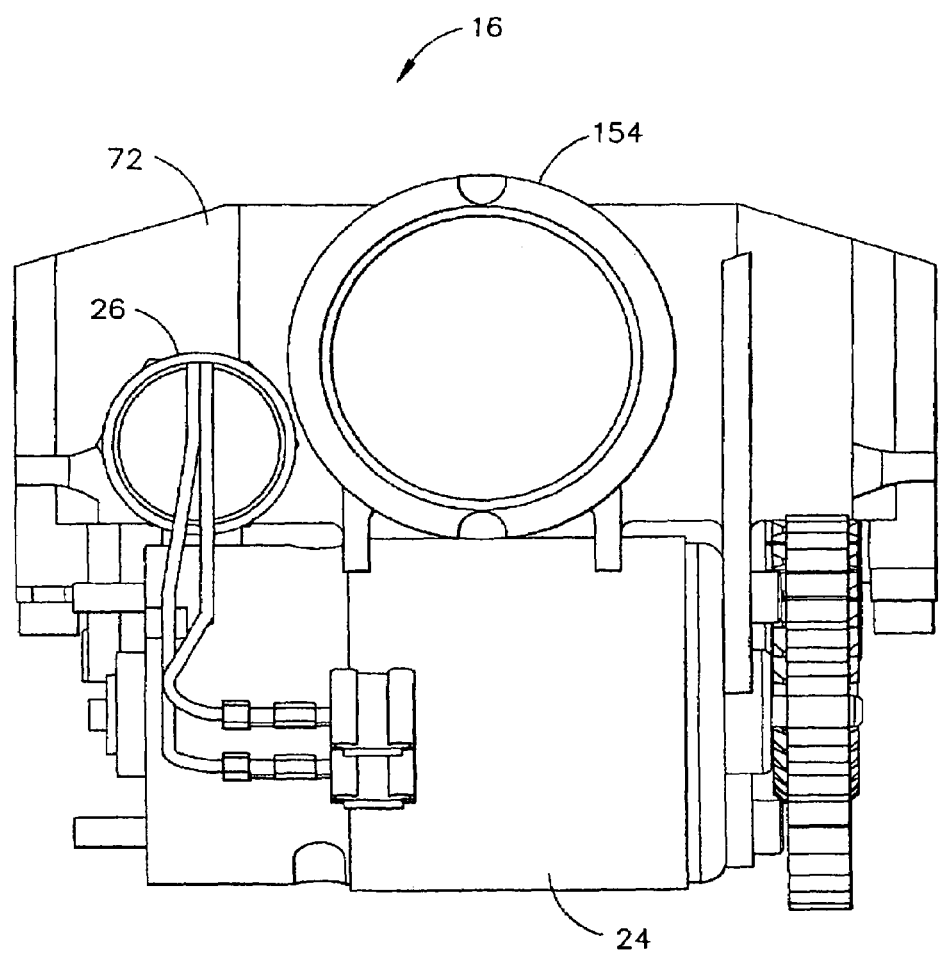
FIG. 5 presents an end elevational view of the fastener drive assembly as removed from the nailing machine illustrated in FIG. 1 and having the electrical control module removed for clarity.
Figure 6:
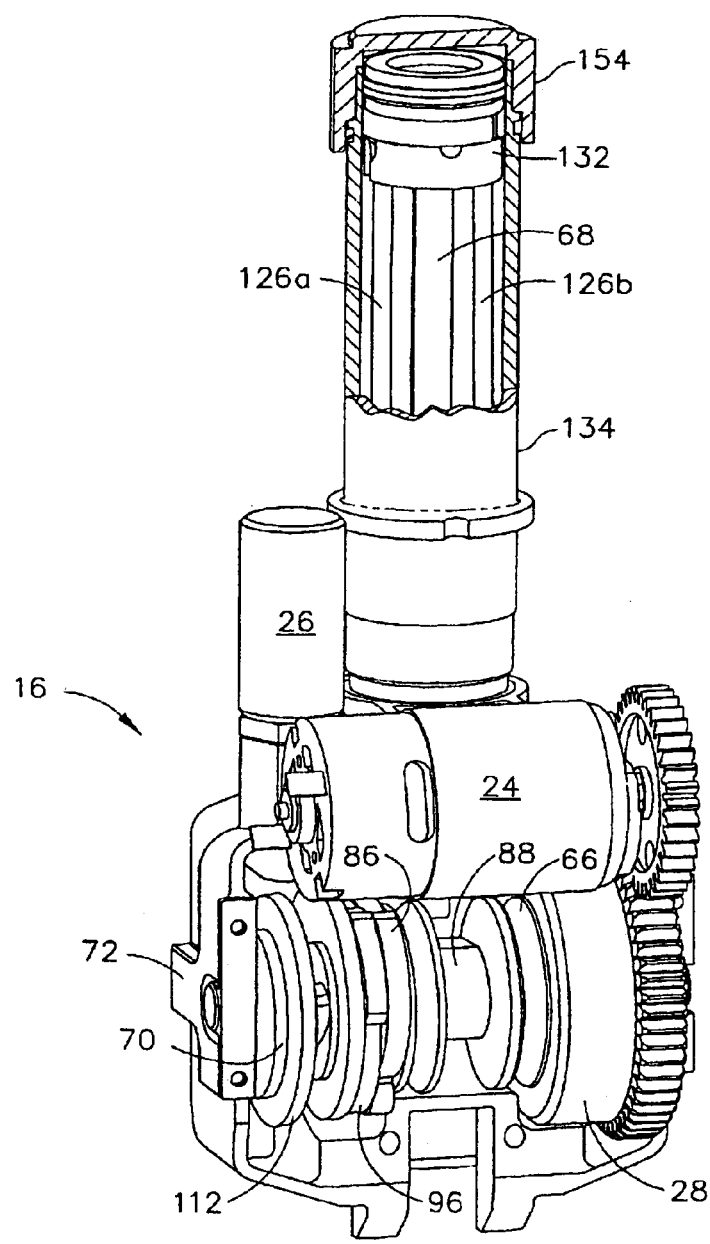
FIG. 6 presents a pictorial view of the fastener drive assembly, having the electrical control module removed for clarity, showing the general arrangement the clutch drive assembly components.

FIGS. 2, 3, 4, and 5 illustrate top, left side, bottom and rear views of the fastener drive assembly 16 as positioned within the main body 14 of the nailing tool 10 illustrated in FIG. 1. FIGS. 2, 4, and 5 have electrical control module 18 removed for clarity. As illustrated in FIG. 6, the primary operational elements of fastener drive assembly 16 comprise the flywheel 28 for providing kinetic energy, for driving a fastener into a workpiece, energized by an electric motor 24. Flywheel 28 is freewheeling upon a fixed central shaft 62. Upon achieving the required revolutions per minute (RPM), a clutch drive assembly 64 (see FIGS. 7 and 9) causes engagement of a clutch plate 66 and flywheel 28 thereby transferring a portion of the kinetic energy of flywheel 28 to a linearly moving fastener driver 68 for driving a fastener into a workpiece. The flywheel 28 is thereafter allowed to continue spinning with any remaining kinetic energy between cycles to further conserve electrical power and to reduce cycle time.

Figure 9:
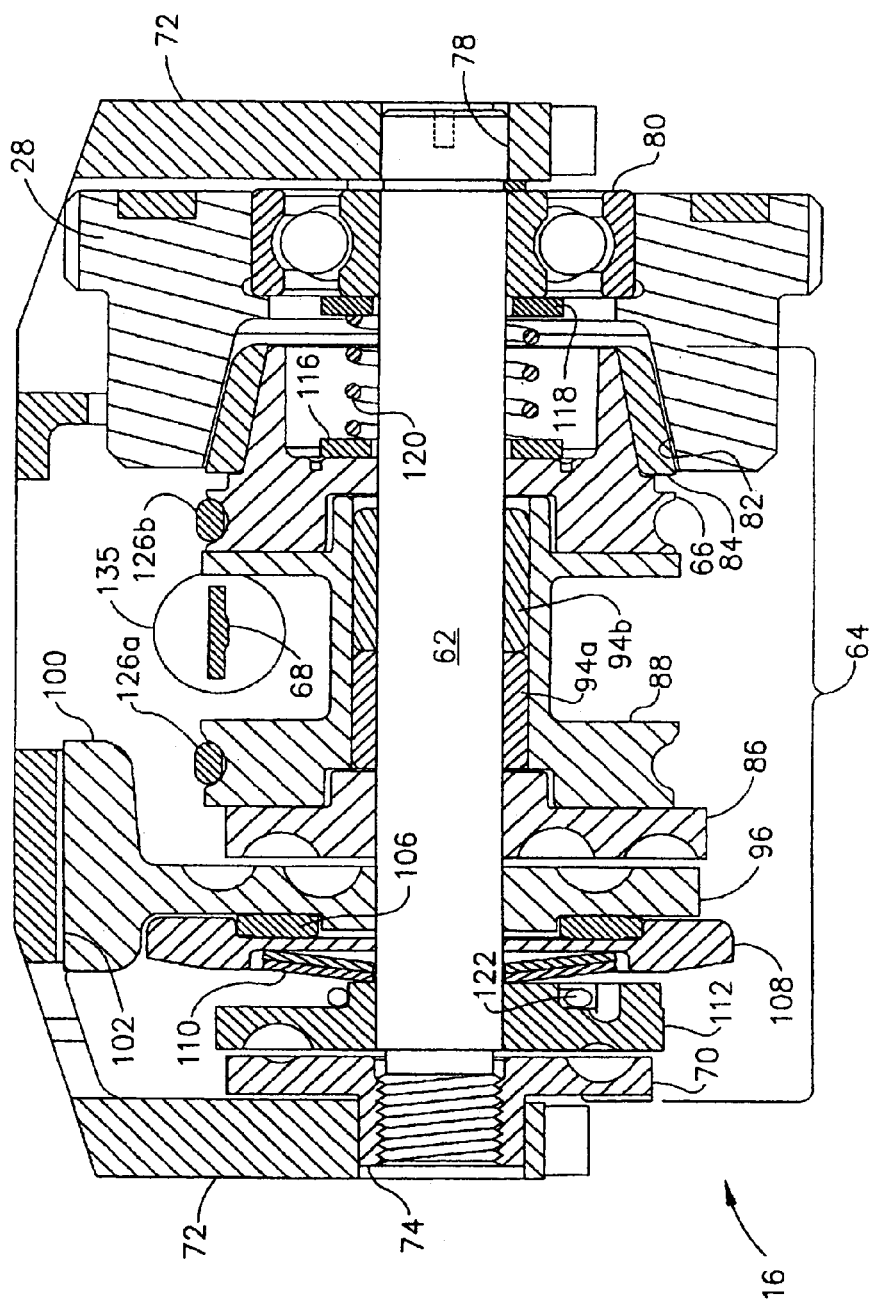
FIG. 9 presents a sectional view taken along line 9—9 in FIG. 4.

Referring now to FIGS. 2, through 9, the elements and operation of the fastener drive assembly 16 will be discussed. The fastener drive assembly 16 comprises clutch drive assembly 64 and flywheel 28 gear driven by electric motor 24. Although a gear drive between motor 24 and flywheel 28 is primarily illustrated herein, it is understood that a belt drive may also be used between motor 24 and flywheel 28 or any other suitable drive mechanism. As an alternative to having the motor axis of rotation parallel to the axis of rotation of flywheel 28, as illustrated herein, it may be preferable to position motor 24 such that its axis of rotation is perpendicular to the axis of rotation of flywheel 28 and shaft 62, thereby employing a bevel gear drive between the motor output shaft and the flywheel periphery.

Figure 7:
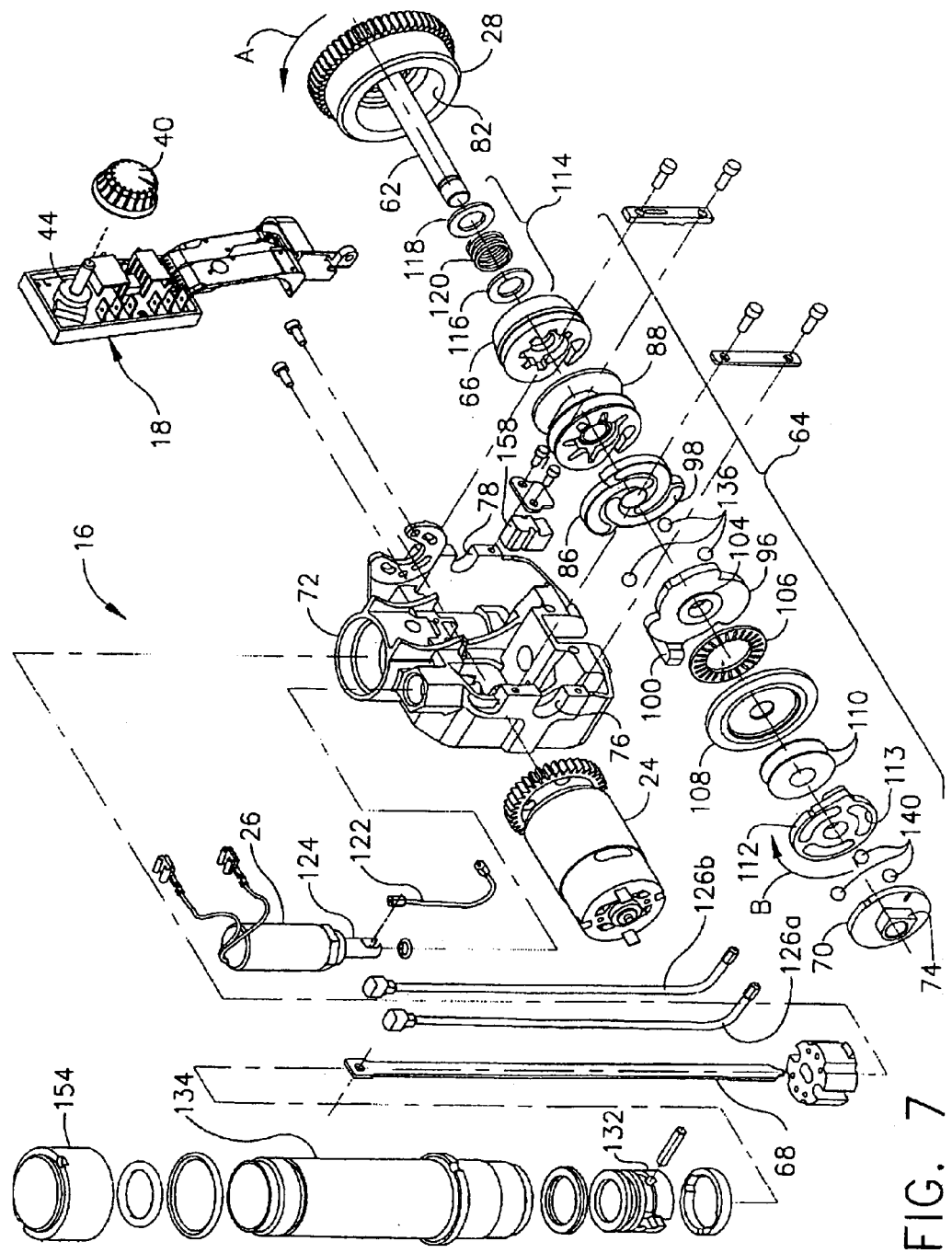
FIG. 7 presents an exploded pictorial view showing the components of the fastener drive assembly illustrated in FIGS. 2 through 6.
Figure 8:
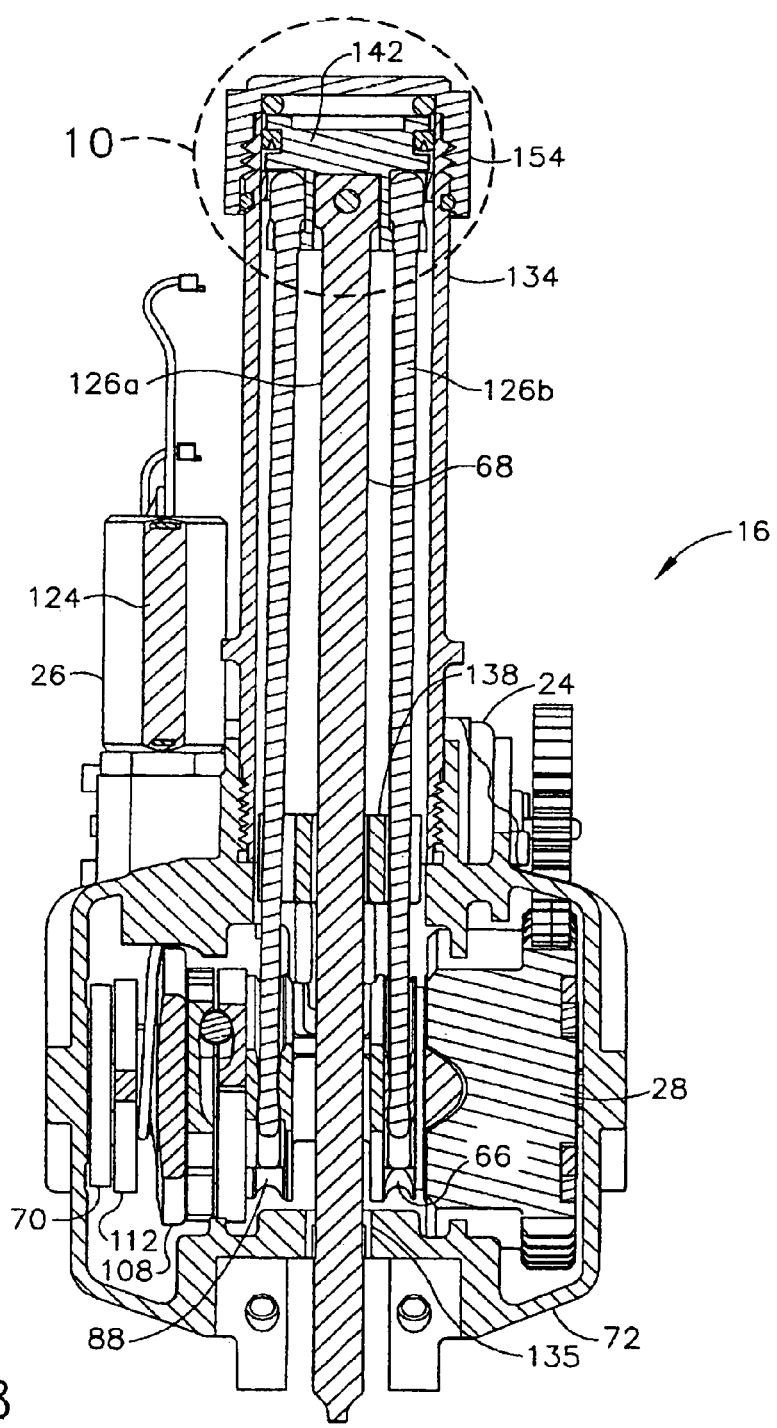
FIG. 8 presents a sectional view taken along line 8—8 in FIG. 3.

Referring particularly to FIG. 9 and additionally to FIGS. 6 through 8, the mechanical structure of flywheel 28 and clutch drive assembly 64 will be operationally described.

Clutch drive assembly 64 and flywheel 28 are axially aligned upon central shaft 62 as best illustrated in FIG. 9. Central shaft 62 is threadingly affixed to end plate 70 which in turn is rigidly attached to a frame 72 by an integral boss 74 extending axially from end plate 70 and received within a slotted groove 76 such that end plate 70 and central shaft 62 are non-rotatable. The opposite end of central shaft 62 is received within supporting groove 78 in frame 72.

Flywheel 28 is rotatingly positioned at the end of central shaft 62, as best illustrated in FIG. 9, upon a deep groove ball bearing 80, whereby flywheel 28 freely rotates about central shaft 62 when energized by motor 24.

Flywheel 28 includes a conical cavity 82 for receiving therein a conical friction surface 84 of conical clutch plate 66. Clutch plate 66 and an activation plate 86, although they are separable members, are geared to a drum 88 by interlocking projections 90 and 92 respectively, whereby clutch plate 66, activation plate 86 and drum 88 rotate freely about shaft 62 as a single unitary assembly. Roller bearings 94a and 94b, positioned on the inside diameter of drum 88, are provided to assure the free rotational characteristic of activation plate 86, drum 88 and clutch plate 66 as a unitary assembly.

Figure 17:
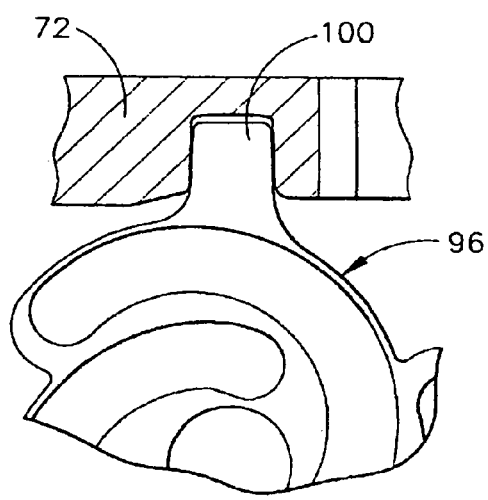
FIG. 17 is a cross-sectional view taken along line 17—17 in FIG. 9.
Figure 16:
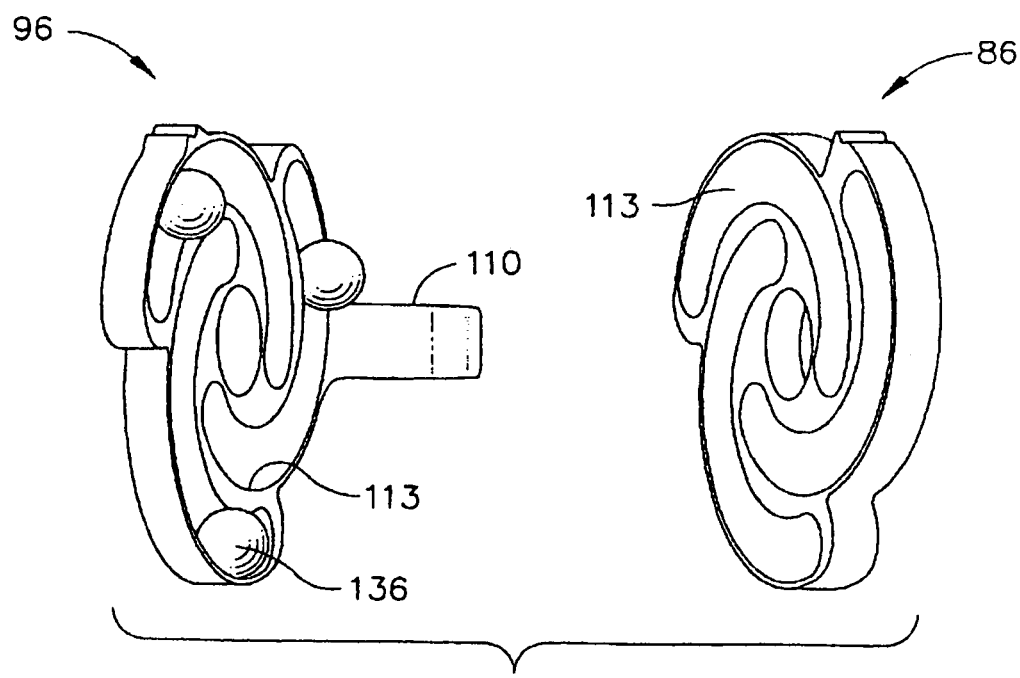
FIG. 16 presents an expanded pictorial view of the activation camming plates.

Adjacent activation plate 86 is a fixed plate 96. Fixed plate 96 and activation plate 86 are connected to one another by three equally spaced axially expandable ball ramps 98a, 98b, 98c, 98a', 98b', and 98c' as illustrated in FIG. 16. The operation of the ball ramps 98 between fixed plate 96 and activation plate 86 is described in greater detail below. Fixed plate 96 is fixed to frame 72 such that fixed plate 96 is free to move axially upon central shaft 62, but not free to rotate about central shaft 62 by an anti-rotation tang 100 slidably received within an axially aligned slot 102 within frame 72. See FIG. 17.

Figure 15:
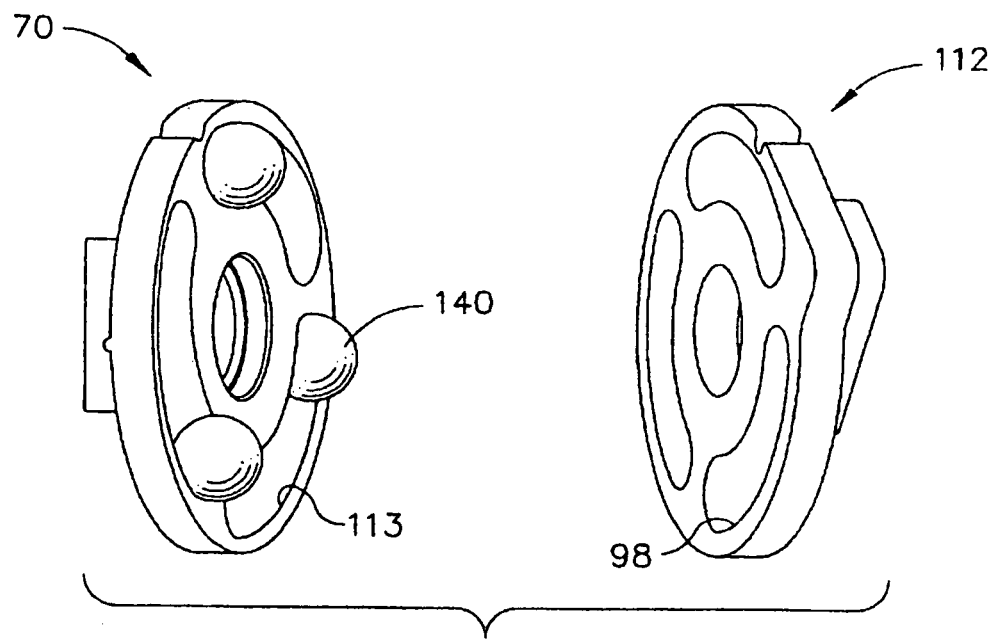
FIG. 15 presents an expanded pictorial view of the solenoid camming plates.

Fixed plate 96 includes a circular projection 104 receiving thereon freely rotatable thrust bearing 106 positioned between fixed plate 96 and a retarder plate 108. A pair of nested, parallel acting, Belleville springs 110 are positioned, as illustrated in FIG. 9, between retarder plate 108 and a solenoid plate 112 the function of which is described in greater detail below. Axially expandable ball ramps 113, see FIG. 15, connect end plate 70 and solenoid plate 112, the function of which is also described in greater detail below.

Positioned upon central shaft 62, between clutch plate 66 and flywheel 28, is a compression spring assembly 114 comprising washers 116 and 118 having a coil spring 120 therebetween the function of which is described in further detail below.

Upon start of the fastener work, or driving, cycle, the control module 18 causes motor 24 to "spin up" flywheel 28, in the counter clockwise direction as indicated by arrow A in FIG. 7, to a predetermined RPM. Upon flywheel 28 achieving its desired RPM, or kinetic energy state, the control module 18 activates solenoid 26 which, through a flexible wire solenoid cable 122 extending from a solenoid plunger 124 and affixed to the periphery of solenoid plate 112 causes solenoid plate 112 to rotate clockwise, as indicated by arrow B in FIG. 7. As solenoid plate 112 rotates clockwise, solenoid plate 112 is caused to move axially away from end plate 70 by action of the corresponding ball ramps 98 in end plate 70 and solenoid plate 112. See FIG. 15. As end plate 70 and solenoid plate 112 axially separate, the remaining elements of clutch drive assembly 64 are thereby caused to move axially toward flywheel 28 compressing coil spring 120 whereby clutch surface 36 preliminarily engages flywheel cavity 44. Engagement of clutch plate 66 with flywheel 28 causes counter clockwise rotation of clutch plate 66, drum 88 and activation plate 86, as an assembly. By action of corresponding ball ramps 98, between fixed plate 96 and activation plate 86, see FIG. 16, rotation of activation plate 86 causes axial separation of clutch plate 66 and activation plate 86. Belleville springs 72 are thus compressed against solenoid plate 112 thereby providing an opposite axial force, forcing clutch plate 66 into tighter engagement with flywheel 28.

As drum 88 rotates counter clockwise, cables 126a and 126b wrap about peripheral grooves 128 and 130 in drum 88 and clutch plate 66 respectively, thereby drawing a vacuum return piston assembly 132 downward, within a cylinder 134, in a power, or working, stroke whereby the attached fastener driver 68 is likewise driven downward, through guide block 108 and opening 135 within frame 72, thereby driving a selected fastener into a targeted workpiece.

FIGS. 13A through 13C sequentially illustrate the action between fixed plate 96 and activation plate 86 as plate 86 rotates during the power stroke of clutch drive assembly 64. Although ball ramps 98 of fixed plate 96 and activation plate 86 are helical as illustrated in FIG. 16, ramps 98 are illustrated as being linear in FIGS. 13A through 13C for simplicity of explanation.

FIG. 13A illustrates fixed plate 96 and activation plate 86 at the beginning of the tool's work cycle. As flywheel 28 drives activation plate 86 counter clockwise (to the left in FIG. 13A) balls 136, following the profile of ramp 98, cause a fast and sudden separation x, between activation plate 86 and fixed plate 96 as illustrated in FIG. 13B. Separation x is maintained throughout the power stroke of fastener driver 68, as illustrated in FIG. 13B, thereby affecting the transfer of the kinetic energy, stored within flywheel 28, to a driver 68 as described above. At the end of the power stroke, as illustrated in FIG. 13C, plates 96 and 86 suddenly close together thereby causing the rapid disengagement of clutch plate 66 from flywheel 28.

FIG. 14 presents a representative graphical plot of the separation x between activation plate 86 and fixed plate 96 as a function of the angle of rotation of activation plate 86. A combination driver guide and resilient stop block 138 is preferably positioned at the bottom of cylinder 134 to stop piston assembly 132, within cylinder 134, at the end of the power stroke.

Figure 12:
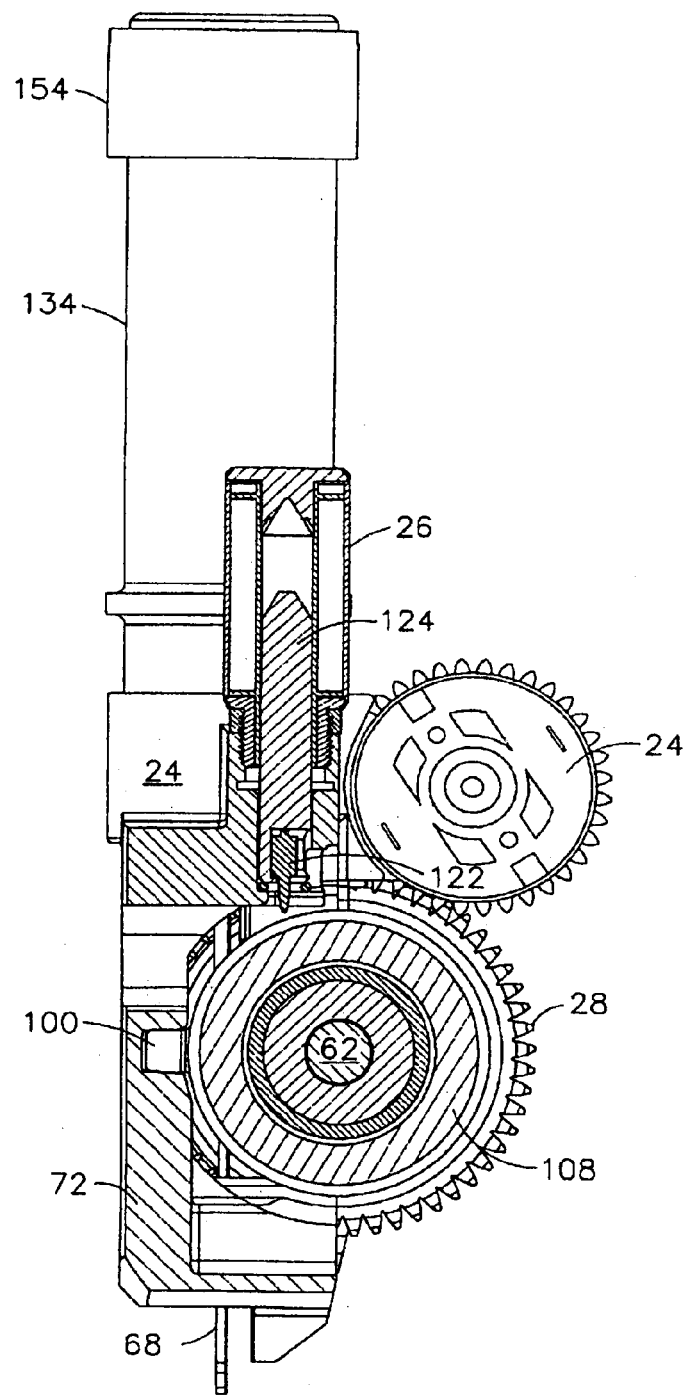
FIG. 12 is a sectional view taken along line 12—12 in FIG. 4.

Upon disengagement of clutch plate 66 from flywheel 28, coil spring 120 urges all elements of clutch drive assembly 64 back toward end plate 70. The resulting axial force and pressure now being applied to solenoid plate 112, by action of coil spring 120 and Belleville springs 74, cause solenoid plate 112 to close upon end plate 70. The pressure being exerted, by solenoid plate 112, upon balls 140 cause solenoid plate 112 to rotate, counterclockwise, towards its original start position whereby solenoid cable 122, being wrapped about solenoid plate 112, stops the rotation of solenoid plate 112 when solenoid plunger 124 returns to its start position as illustrated in FIG. 12. In order to decrease the tensile stress applied to solenoid cable 122 as it stops, the counterclockwise rotation of solenoid plate 112 and retarder plate 108 is provided. By action of the axial force remaining within Belleville springs 72, retarder plate 108 and solenoid plate 112, as an assembly, exhibit a combined mass and/or inertia greater than that of solenoid plate 112 alone. Thus, during the short period of time during which the combined solenoid plate 112 and retarder plate 108 assembly is rotationally accelerated the rotational velocity achieved has been reduced and upon separation of retarder plate 108 from solenoid plate 112, solenoid plate 112 has a lower angular momentum resulting in a lower tensile stress being applied to solenoid cable 122 as it stops rotation of solenoid plate 112. Once retarder plate 108 is uncoupled from solenoid plate 112, retarder plate 108 freely rotates about central shaft 62 until its kinetic energy dissipates. By use of retarder plate 108 the mass and/or inertia of solenoid plate 112 may be selectively chosen so as not to unnecessarily stress solenoid cable 122 upon stopping the rotation of solenoid plate 112.

By constructing the clutch drive assembly 64, as taught hereinabove, clutch plate 66 disengages from flywheel 28 thereby allowing flywheel 28 to continue spinning after clutch drive assembly 64 has reached the end of its power stroke. Thus in the event it is desired to successively drive additional fasteners, the remaining kinetic energy is available for the subsequent operation thereby economizing battery power and saving the drive assembly elements and/or the frame 72 from having to absorb the impact that would otherwise occur by bringing flywheel 28 to a full stop immediately after the power stroke. This feature also permits "dry firing" of the tool.

The clutch drive system as taught herein also provides for automatic compensation for clutch wear in that the expansion between end plate 70 and solenoid plate 112 will continue until clutch plate 66 engages flywheel 28 thereby allowing solenoid plate 112 to take up the difference at the start of every power drive.

Figure 10:
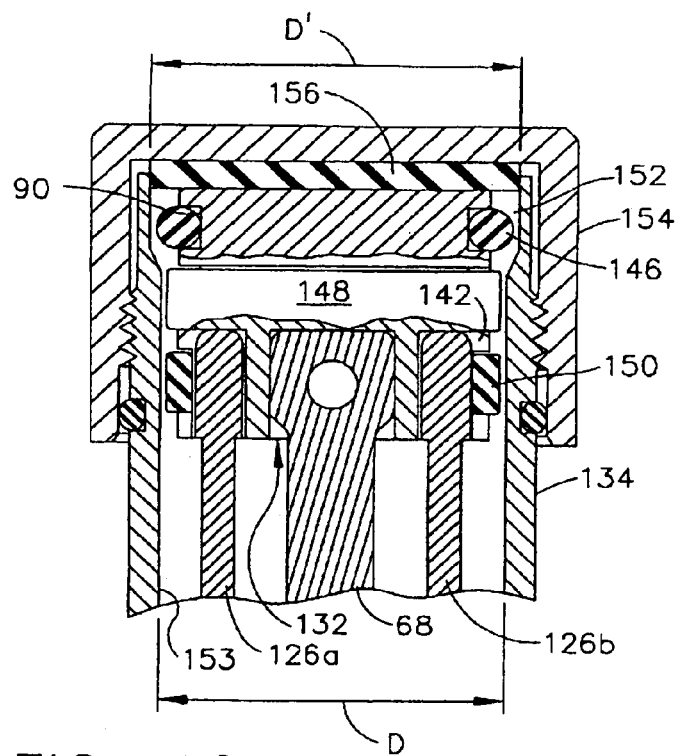
FIG. 10 presents an enlarged view of the circled section in FIG. 8.

Referring now to FIG. 10. Vacuum return piston assembly 132 comprises piston 142 slidably received within cylinder 134. Spaced from the top of piston 142 is a circumscribing groove 144 having positioned therein a sealing O-ring 146. Positioned toward the bottom of piston 142 are two axial stabilizing bands 148 and 150.

The inside diameter D, of cylinder 134, is flared outward to diameter D' at the top of cylinder 134 as illustrated in FIG. 10. Diameter D' is slightly greater than the outside diameter of O-ring 146 thus creating an annular gap 152 between O-ring 146 and inside diameter D'.

As piston assembly 132 is drawn axially into cylinder 134, during the power stroke of fastener driver 68, O-ring 146 slidingly engages the inside wall diameter D of cylinder 134 thereby forming a pneumatic seal between inside wall 153 of cylinder 134 and piston assembly 132. As piston assembly 132 progresses into cylinder 134, a vacuum is created within the top portion of cylinder 134, between advancing piston assembly 132 and the sealed end cap 154.

Upon disengagement of friction clutch plate 66 from flywheel 28, the vacuum created within the top portion of cylinder 134 draws piston assembly 132 back toward an end cap 154 thereby resetting activation plate 86, drum 88, and clutch plate 66, as an assembly, to their restart position.

As O-ring 146 passes from inside diameter D to diameter D', on its return stroke, any air that may have by passed O-ring 146, during the power stroke, is compressed and permitted to flow past O-ring 146 through annular gap 152 and to the atmosphere through cylinder 134, thereby preventing an accumulation of entrapped air above piston assembly 132. A resilient end stop 156 is preferably positioned within end cap to absorb any impact that may occur as piston assembly 132 returns to its start position at the top of cylinder 134.

Figure 11:
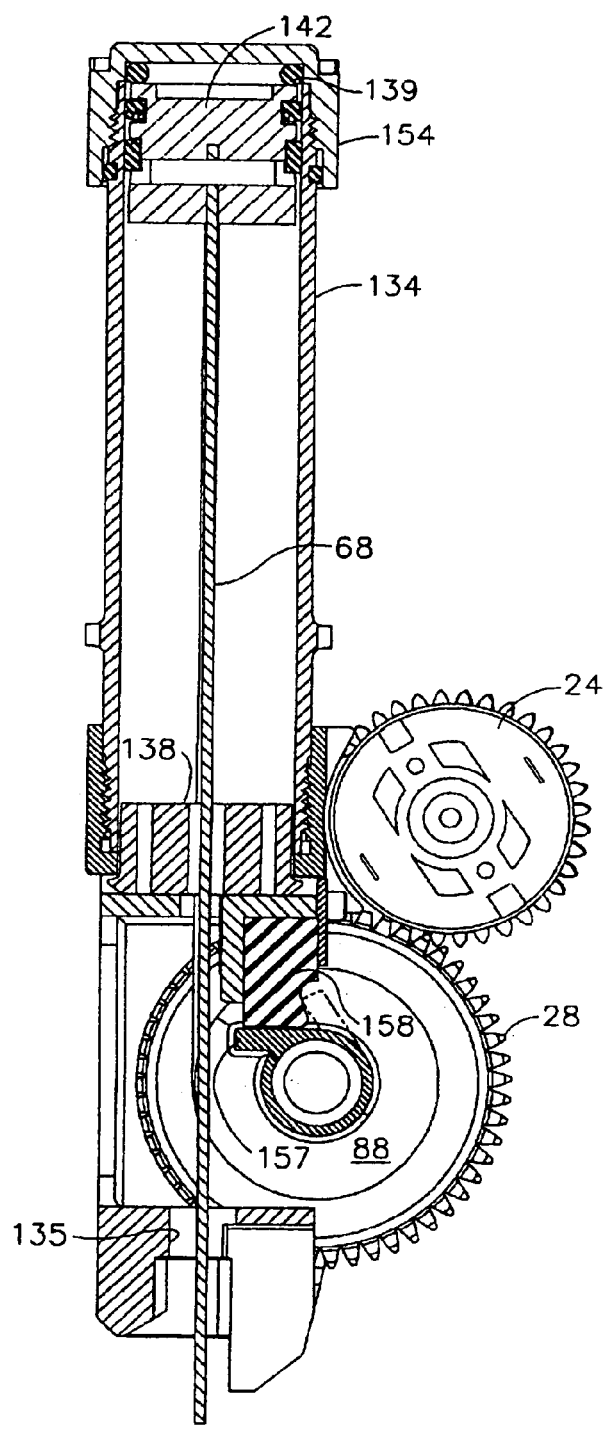
FIG. 11 is a sectional view taken along line 11—11 in FIG. 4.

As drum 88 returns to its start position tang 157 radially extending from drum 88 engages abutment block 158 affixed to frame 72, see FIG. 11, thereby preventing over travel of drum 88 as it returns to its start position.

It will be appreciated that the above-described fastener drive assembly 16 is illustrative and that aspects of the invention have application in other types of fastener drive assemblies.

Additional structural and operational details of the fastener drive assembly 16 is completely described within the two co-pending patent applications identified in the "Related Patent Applications" section above and are incorporated herein by reference.

Speed Controller

Figure 18:
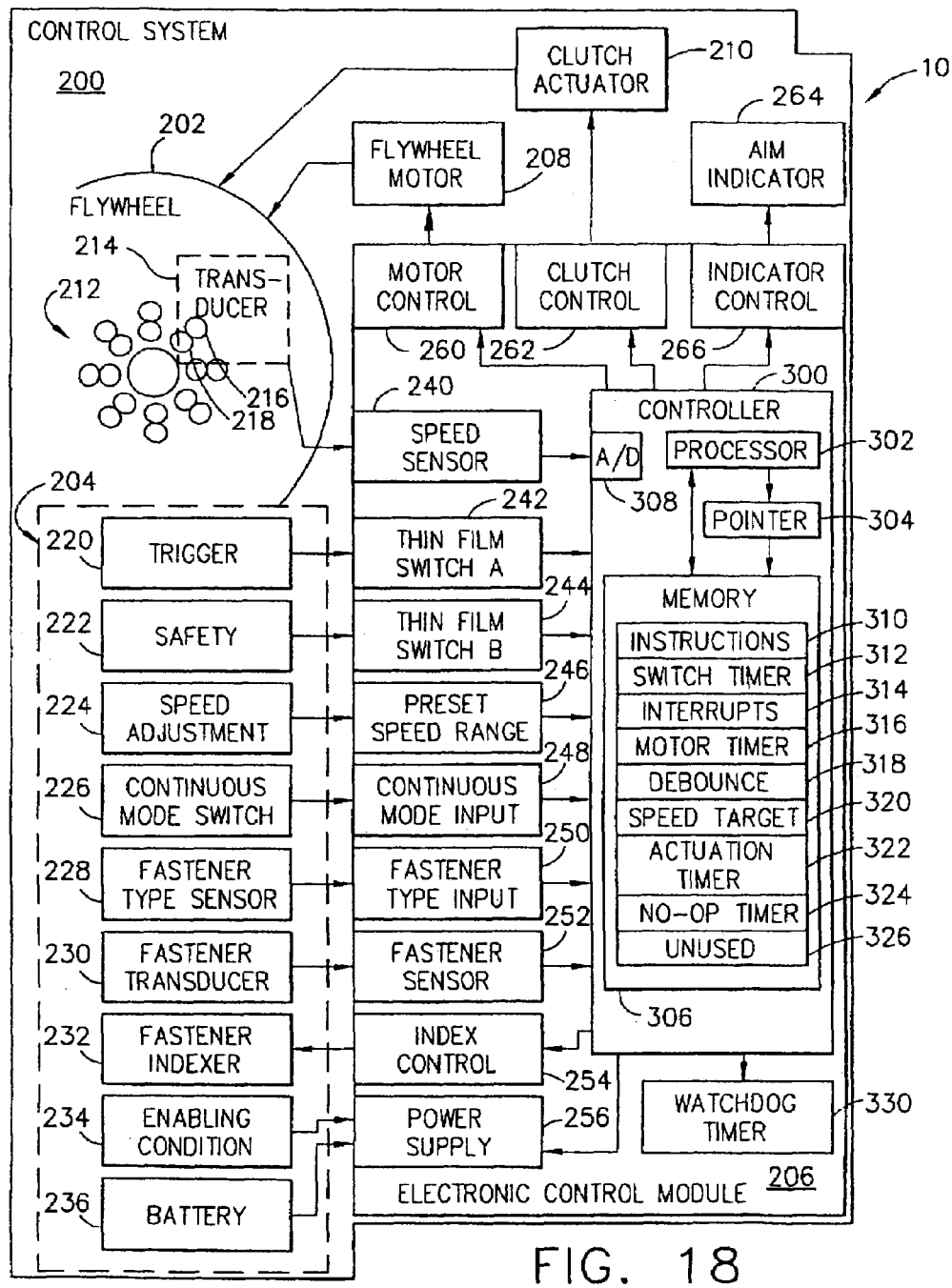
FIG. 18 presents a block diagram of a control system for the fastener-driving tool of FIG. 1.

FIG. 18 depicts a control system 200 for a nailing tool 10 that advantageously uses rotary speed sensing of a inertial member, depicted as a flywheel 202, to more consistently and efficiently drive a fastener into a workpiece. The control system 200 responds to input signals 204 received and processed by an electronic control module 206 to command a motive device, such as a flywheel motor 208, to accelerate the flywheel 202. The control module 206 further commands a clutch actuator 210 to transfer kinetic energy from the flywheel 202 to a fastener.

A signal representative of the rotational rate (e.g., RPM) that a plurality 212 of radially arrayed pairs of magnetic poles rotate with the flywheel 202 is generated by a transducer 214 that senses each closest pair of registered magnetic poles 216, 218 of the plurality 212. In addition to flywheel speed signal, the control system 200 responds to other types of inputs. For example, the input signals 204 may include a trigger input 220, a safety input 222, a user speed adjustment input 224, a continuous flywheel mode switch input 226, a fastener type sensor input 228, and a fastener transducer input 230 for sensing the presence of a fastener positioned for driving.

A fastener indexer 232 may advantageously respond to an electrical command from the control module 206. The electric interface to a separable indexing magazine (not shown) may be readily designed and assembled with electrical interconnects. This advantageously compares to pneumatic power tools with indexing wherein more complicated pneumatic plumbing at the interface of the magazine and main body is required.

The control module 206 may respond to an enabling condition input 234. In some instances, the availability of electrical power in combination with actuation of a trigger or depression of a safety may be deemed an enabling condition for powering the nailing tool 10. Alternatively or in addition, the enabling condition input 234 may represent other input signals that enable or disable the nailing tool 10. For instance, the enabling condition input 234 may include a sensed motor overheat condition, an ON/OFF switch, a battery power voltage level, or presence of an AC electrical power input. The latter may cause the control module 206 to switch power source, or to charge a battery.

Battery input 236 may represent a source of power for the control module 206. In addition, the control module 206 may respond to the voltage level of the battery input 236 by altering time-out values when the control module expects to see acceleration and actuation performed. For example, for a given battery voltage level, the flywheel motor 208 should accelerate to a given target speed in a certain time range, whereas this time range would be expected to change in relation to the voltage level. Thus, mechanical failures would be more accurately detected by more accurately predicting the performance thereof.

The electronic control module 206 includes interfaces 240–256 for these input signals 204. A speed sensor 240 may convert the speed signal from the transducer 214 into another form. For instance, the speed sensor may convert an analog signal into a near DC signal (digital signal) suitable for digital signal processing. A thin film switch "A" 242 converts a mechanical trigger input 220 into an electrical trigger signal. A thin film switch "B" 244 converts a mechanical safety input 222 into an electrical safety signal. A preset speed range interface 246 may fully comprise a speed selection or define a flywheel speed range for user speed adjustment input 224. The present speed range interface 246 may define a range constrained by a combination of the operable range of the flywheel motor 208 and/or clutch actuator 210 and the force requirements expected for the fastener and type of workpiece. A continuous mode input 248 receives a selection for continuous or intermittent mode for the flywheel. It should be appreciated that continuous mode or intermittent mode may be used at the exclusion of the other mode. Alternatively or in addition, the selection may be determined based on another consideration such as state of charge of the battery (e.g., switching to intermittent mode to save electrical power when a battery is partially discharged). A fastener type input interface 250 senses or accepts a selection from the fastener type sensor input 228, which may advantageously adjust speed and timing considerations. A fastener sensor interface 252 responds the fastener transducer input 230 to convert the signal into a form suitable for digital processing. The control module 206 may respond to the presence or absence of a fastener ready for driving in a number of fashions. For example, dry firing may be prevented to avoid wear or a jam of a partially loaded or improper fastener; an indication of the need to load the magazine may be given, a continuous mode for the flywheel may be discontinued, etc. For applications with an indexing magazine, an index control interface 254 provides an index signal suitable for the fastener indexer 232.

The control module 206 is depicted as including a power supply 256 that responds to the enabling condition input 234 and the battery input 236. It should be appreciated that the power supply may comprise a power source for the control module 206 only, wherein power drain on the battery is prevented by shutting down the control module 206 except when commanded to drive a fastener or when in continuous mode and the tool 10 is enabled. The power supply 256 may further represent logic to select a source of electrical power and/or to charge an attached battery. In addition, the power supply 256 may represent additional safety features to prevent electrical power from inadvertently reaching actuating components.

The electronic control module 206 provides a motor control interface 260 to convert a control signal into a form suitable for the flywheel motor 208 (e.g., a logic signal to a pulse width modulated (PWM) power signal). A clutch control interface 262 converts a control signal into a form suitable for the clutch actuator 210 (e.g., a logic signal to power signal).

The control system 200 may advantageously include additional features to the user to include an aim indicator 264 that is controlled by an indicator control interface 266 in the control module 206. For example, in response to an enabling condition such as depression of the safety against a workpiece, a focused light or laser pointer may be directed at the expect point of the fastener. The illumination thereof may assist the user in seeing the workpiece more clearly in dim lighting or to better appreciate the aim of the tool.

The electronic control module 206 advantageously includes a digital controller 300 that is programmed for additional features. To that end, a processor 302 accesses instructions and data by indirect addressing through a pointer 304 of a Random Access Memory 306. The processor and/or memory access analog-to-digital (A/D) inputs 308, such as from the speed sensor 240, that are used and stored in digital form. Although not depicted, another example may be the speed adjustment input 224 and preset speed range interface 246 as being analog inputs. The memory 306 includes instructions 310; a switch timer 312 for monitoring a stuck or inadvertently held switch; interrupts code 314 for handling time sensitive signals or abnormal processing; a motor timer 316 for monitoring overlong motor operation that could result in overheating; a switch debounce buffer 318 for precluding inadvertent or spurious switch signals from being acted upon; a speed target register 320 for holding a preset or calculated value for a desired or appropriate flywheel speed; an actuation timer register 322 for holding a preset or calculated value for monitoring for abnormally long time for transfer kinetic energy to the driver by actuation; a no-operation (no op) timer 324 for timing when to deactivate; or other data structures or unused memory 326

It will be appreciated that the instructions 310 include diagnostic code to perform RAM checking, verifying that all memory locations are working properly prior to use and that the program counter 304 is indexing correctly. The diagnostic code further checks that jumps and returns from subroutine locations return back to the correct location. In addition, the diagnostic code checks that when the processor 302 tells a pin to go high or low that the line attached to the pin responds accordingly.

The control module 206 includes a watch dog timer circuit 330 that prevents a processing failure. Throughout processing, it will be appreciated that the watch dog timer circuit 330 is periodically reset by the processor 302, lest a time limit be reached that initiates resetting or disabling the control module 206.

Figure 19:
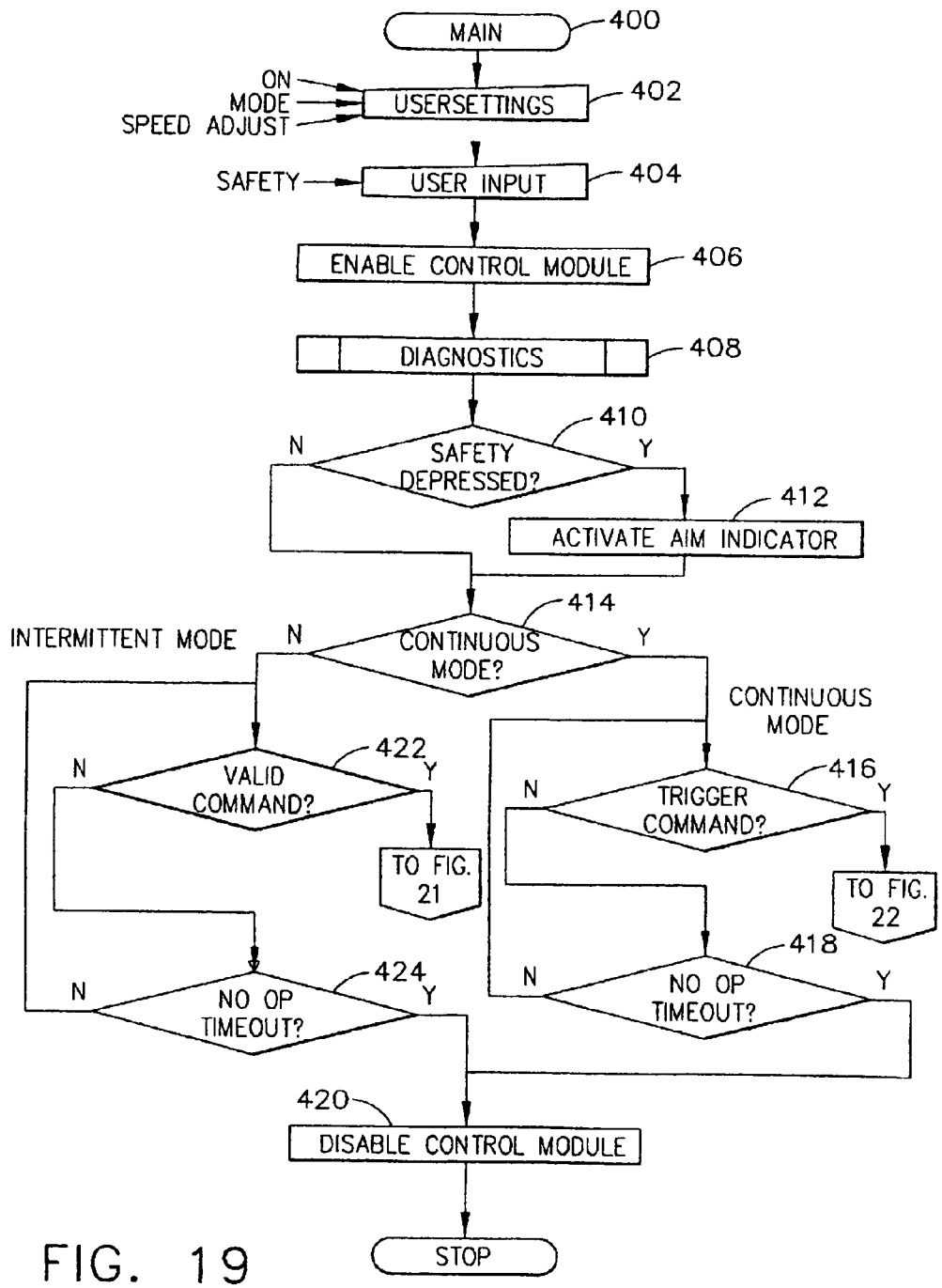
FIG. 19 presents a flow diagram for a sequence of steps, or main routine, for a controller of FIG. 18 to operate the fastener-driving tool.

In FIG. 19, an illustrative sequence of steps for utilizing the control system 200 to affect control of the tool 10 is depicted as a main routine 400. Before driving a fastener, user settings are available (block 402). For instance, a user setting may include an enabling condition such as an ON setting or a momentary actuation of a control (e.g., trigger, safety). A user setting may include a MODE setting, such as continuous, intermittent, or automatic (e.g., the control system determines the appropriate mode). The user setting may include a speed adjust setting, to include a factory preset range appropriate for the fastener drive assembly, a range appropriate for the type of fastener sensed, or a user selected range.

In the illustrative embodiment, a user input, such as depression of the safety switch, begins processing (block 404) by enabling the control system (block 406). Immediately, the control module performs diagnostics to preclude failures that may cause an inadvertent activation and actuation of the tool (block 408), discussed in more detail below. It will be appreciated that certain diagnostic features continue to be performed throughout operation.

Once diagnostics are complete, with a determination is made as to whether the safety is depressed (block 410). If so, an aim indicator is activated (block 412). This feature is included to illustrate features that may be performed to give visual indications to the user about the operation or condition of the tool.

Thereafter, a determination is made as to whether the tool is in continuous mode (block 414). This determination may be preset, user selected, or automatically selected based on considerations such as battery voltage. If in continuous mode in block 414, then a further determination is made as to whether an input has been made to ready the tool for actuation, for instance a depression of the trigger (block 416). And if so, the continuous mode is initiated as described below. Otherwise, an additional determination is made as to whether a no op timer has expired (block 418). If no operations have been received within a suitable time, then the control module is disabled (block 420) to prevent battery drain and preclude inadvertent actuation. If in block 418 the no op time-out has not occurred, then processing continues to wait for a trigger command to initiate the continuous operating of the flywheel.

Returning to block 414, if continuous mode is not selected or appropriate, then the main routine 400 is in an intermittent mode that advantageously accelerates the flywheel to a target speed each time a fastener is to be driven. Thus, battery power is conserved between driving cycles. Since residual kinetic energy of the flywheel is conserved by the fastener drive assembly, the cycle time is still short even in intermittent mode. In intermittent mode, a determination is made as to whether a valid command to drive a fastener has been received (block 422), and if so, initiating intermittent acceleration of the flywheel will be discussed below, as well as the forced sequence of the safety and the trigger for a valid command. If a valid command is not received in block 422, then a further determination is made as to whether a no op time-out limit has been reached (block 424), and if so the control module is disabled (block 420) and routine 400 is complete.

Figure 20:
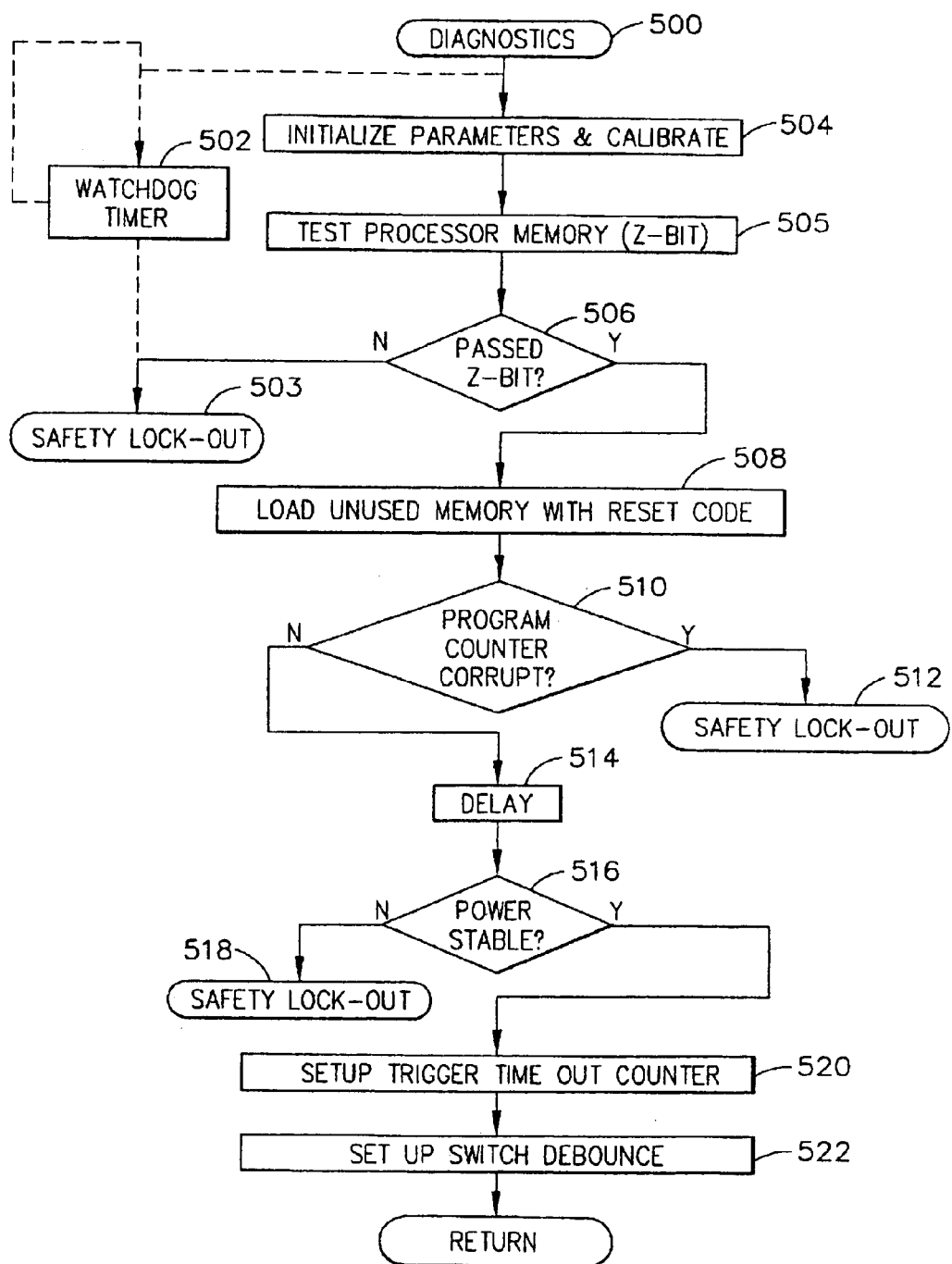
FIG. 20 presents a flow diagram of a diagnostic routine, referenced by the main routine of FIG. 19.

FIG. 20 depicts the diagnostics routine 500 referenced in FIG. 19. Certain diagnostic tests are performed upon powering up the control module and other tests continue in background during operation of the tool. For example, a watchdog timer (block 502) is depicted, wherein a dedicated circuit times the period since the last update from the processor. If the watchdog timer is not updated before timing out, the control module is assumed to be processing abnormally and the tool is placed in a safety lockout mode (block 503). This watchdog timer continues operation throughout the main routine 400.

Also, digital parameters are initialized and any calibrations are performed (block 504). For example, interrupt vectors are set so that any resets will be appropriately handled. Also, analog devices like oscillators are calibrated. Then the processor memory is tested by checking for any failure to toggle and to read a memory location (Z BIT) (block 505). If Z BIT fails (block 506), then safety lock-out mode is set (block 503), else any unused memory is loaded with a reset code (e.g., interrupt vector) (block 508). In addition, a check is made as to whether the program counter (pointer) is corrupt (block 510), and if so safety lockout mode is set (block 512). If the program is not corrupt in block 510, then a delay occurs to allow for the power supply to the control module to stabilize (block 514). If not stable (block 516), then safety lockout mode is set (block 518). If stable in block 516, then the trigger time-out counter is set up so that overly long trigger commands due not result in actuation (block 520). Also, switch debounce code is set up so that momentary or spurious trigger or switch signals are ignored (block 522). Thereafter, routine 500 returns to the main routine 400 of FIG. 19.

Figure 21:
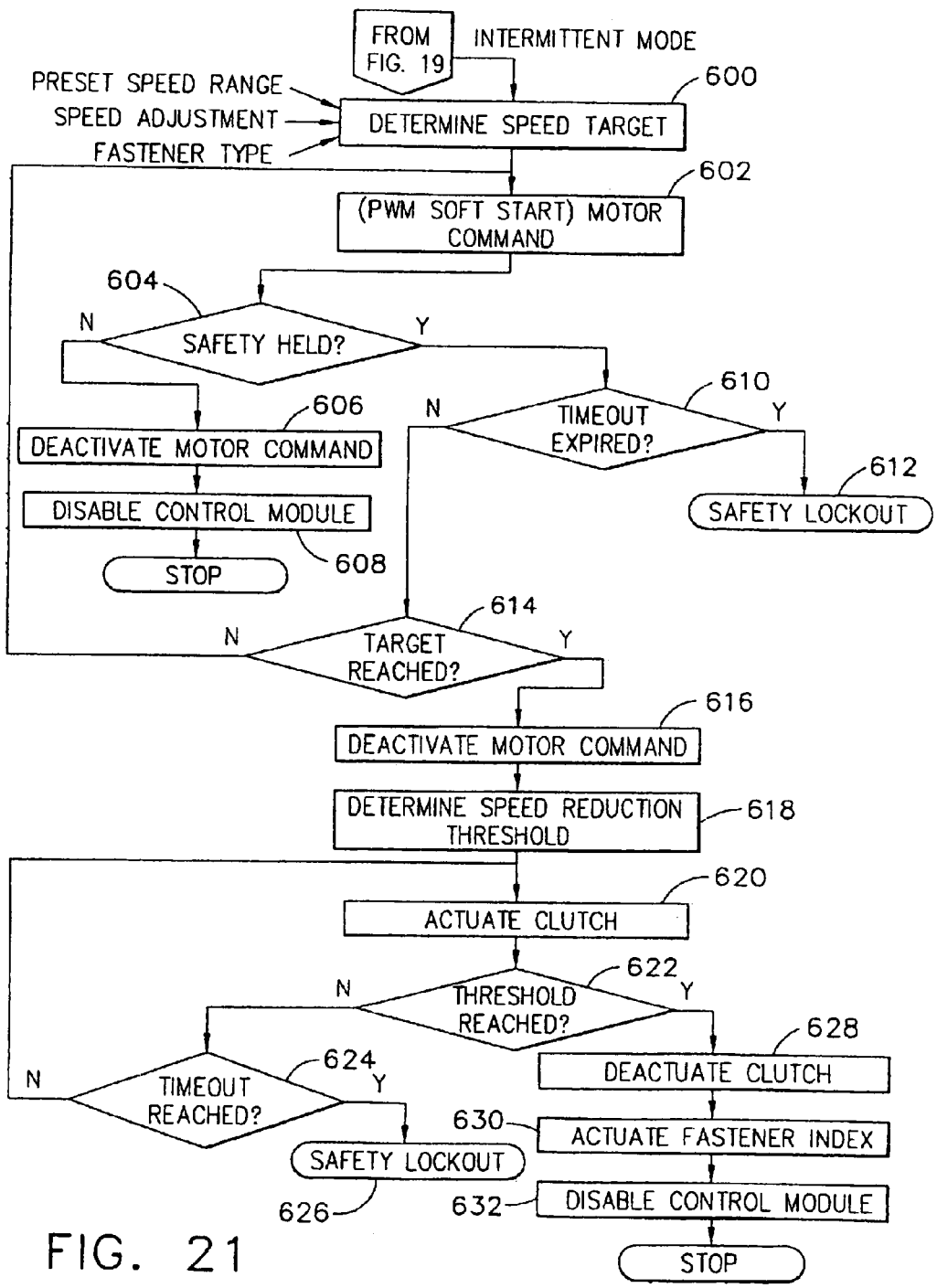
FIG. 21 presents an intermittent mode portion of the main routine of FIG. 19.

FIG. 21 depicts the intermittent mode from block 416 of FIG. 19. In particular, this portion of the main routine 400 begins with a valid command from the user indicating that the flywheel is to be accelerated to the target speed and the driver is to be driven by the flywheel. To that end, the speed target is determined (block 600), which could be based on a preset value, a user selection, a preset speed range adjusted by a user selection, a selection based on a sensed fastener type, or a range based on a sensed fastener type as adjusted by a user selection. With the target set, a motor command is initiated (block 602).

Advantageously, the motor command begins with a Pulse Width Modulated (PWM) soft start is used. Thus, the duty cycle of the PWM command ramps up to a full command level, reducing the initial electrical current demand on the battery and surge to the motor. Thereby, power consumption is greatly reduced and the service life of the motor is extended.

With the flywheel accelerating in response to the motor command, a determination is made as to whether the safety is still held (block 604). Withdrawal of the safety from the workpiece causes the motor command to be deactivated (block 606) and the control module to be disabled (block 608).

If the command is still valid in block 604, then a further determination is made as to whether the motor time-out has expired (block 610). If so, due to a failure in the fastener drive assembly (e.g., stuck clutch, motor failure, weak battery), the safety lockout mode is set (block 612). If the motor has not timed out in block 610, then the current sensed speed is compared to the target. If the target is not reached (block 614), then processing returns to block 602, continuing with a full motor command. If the target speed is reached in block 614, then the motor command is deactivated (block 616).

A speed reduction threshold is determined for imparting or transferring kinetic energy from the flywheel to the linearly moving fastener driver. Thus, not only is a known amount of kinetic energy available in the flywheel, but a known amount is transferred to the driver and thus to the fastener for a consistent depth of drive. Moreover, since the flywheel is not completely stopped during or after transferring the kinetic energy, the remaining kinetic energy is available for a subsequent operation. The speed reduction may be based on a look-up table for the given conditions, based on a fixed ratio of a current speed, or a fixed scalar amount below the target, or other measures.

The clutch is engaged to transfer the kinetic energy to the driver (block 620). Then a determination is made as to whether the threshold is reached (block 622). If not reached, then a further determination is made as to whether the actuation time-out has been reached (block 624), and if so, safety lock-out mode is set (block 626). If in block 622 the time-out is not reached, then actuation is still in progress by returning to block 620. Returning to block 622, if the reduction threshold is reached, then the clutch is deactivated (block 628). If installed and enabled, the fastener index is actuated (block 630). Then the control module is disabled (block 632) and main routine 400 ends.

Figure 22:
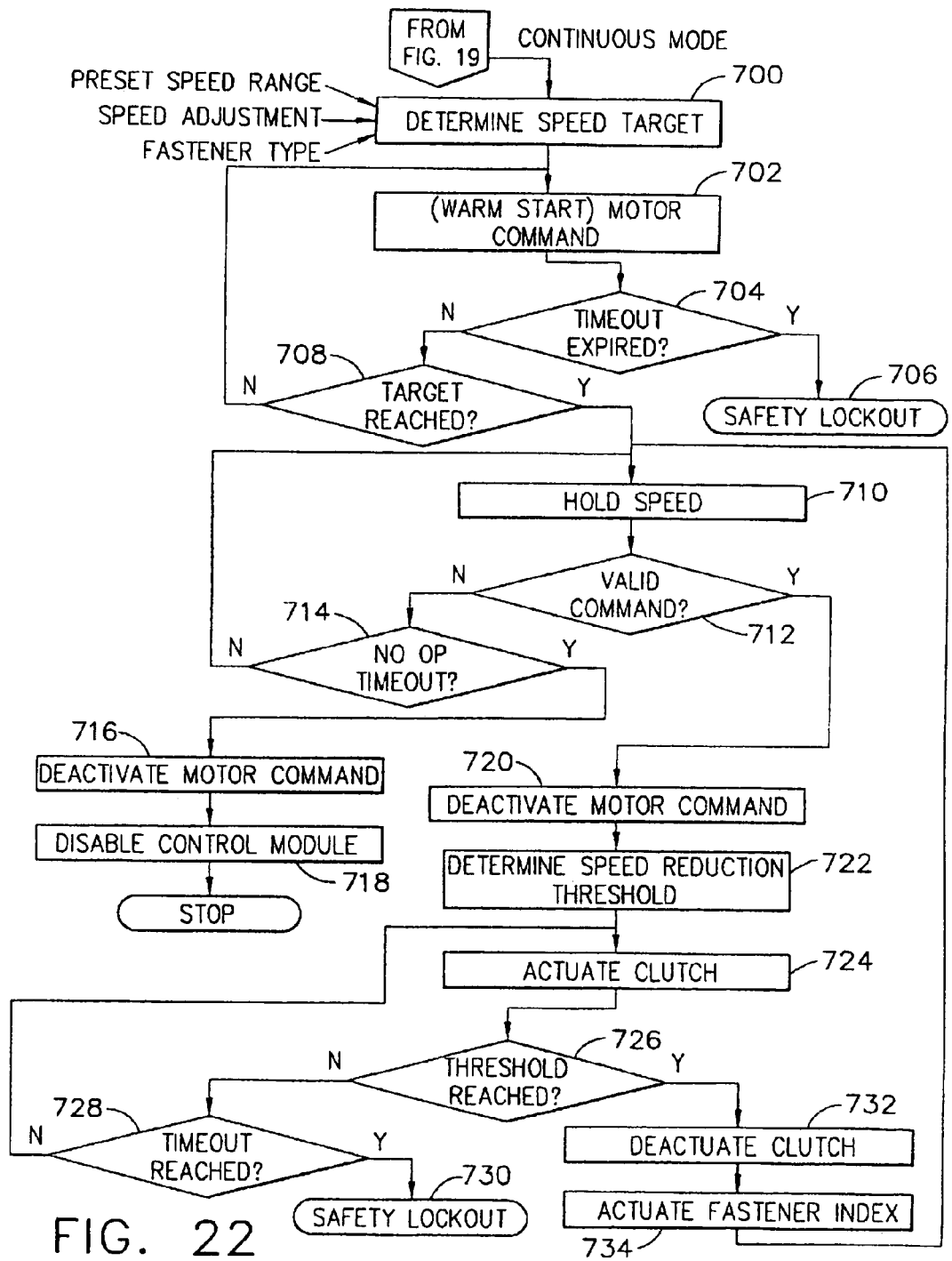
FIG. 22 presents a continuous mode portion of the main routine of FIG. 19.

FIG. 22 depicts the continuous mode portion after a trigger command in block 416 of the main routine 400 of FIG. 19. In particular, the speed target is determined (block 700) and the motor is started (block 702) in a manner similar to that described respectively for blocks 600 and 602. Then a determination is made as to whether the motor time-out has expired, indicating an inability to accelerate the motor in the expected time (block 704). If expired, then safety lockout mode is set (block 706). If not timed out, then a further determination is made as to whether the target has been reached (block 708). If not, then flywheel acceleration continues by returning to block 702.

Advantageously, continuous mode allows addition safety/trigger sequences for a valid command. For instance, rather than requiring the safety signal to precede the trigger signal, ("trigger fire"), the trigger signal may precede the safety signal ("bottom fire"). Again, a trigger time-out (e.g., 3 seconds) is applicable just as is the safety time-out (e.g., 3 seconds) to minimize inadvertent actuation. Bottom fire is included as an option in continuous mode for applications wherein the user desires very short cycle time between drives or has a personal preference for this technique.

If the target is reached in block 708, then the speed is held (block 710). For example an operating range may be entered wherein the motor command is recommenced when a lower limit is reached and removed when an upper limit is reached. Then, a determination is made as to whether a valid command has been received from the user (block 712). If not, a check is made as to whether the no op time-out has occurred (block 714), and if not, the flywheel speed is continuously maintained by returning to block 710. If the no-op timer has expired in block 714, then the motor command is deactivated (716) and the control module is disabled (block 718).

Returning to block 712 wherein a valid command has been received, then the clutch is actuated in a manner similar to that described above for the intermittent mode, wherein blocks 720–734 correspond respectively to block 616–630. However, after deactuating the clutch in block 732 and actuating a fastener index in block 634, control returns to block 710 to continue holding speed in a continuous fashion awaiting the next valid command to drive a fastener.

Figure 23A:
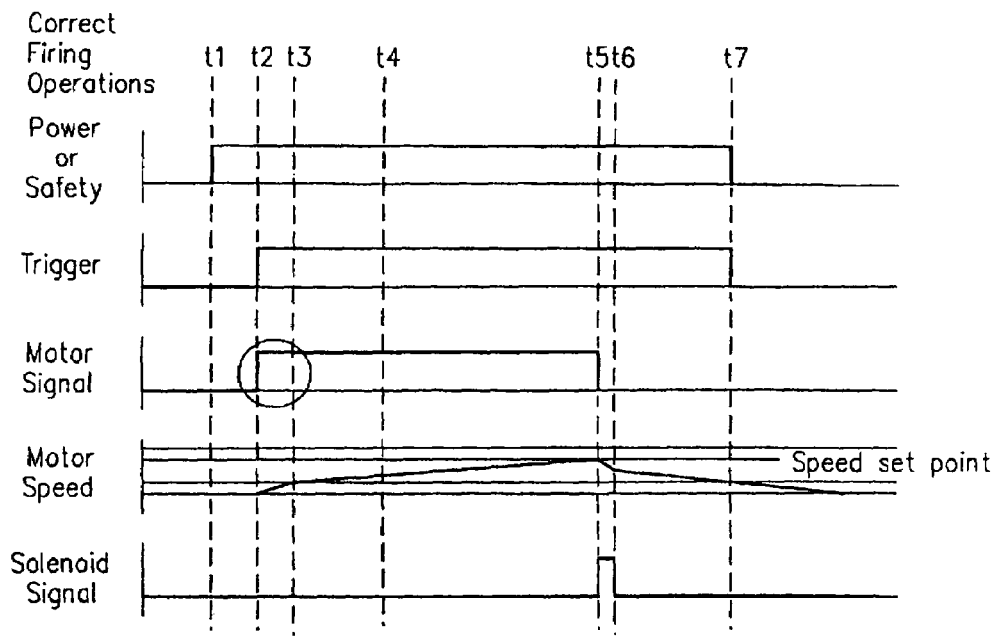
FIG. 23A–23F present illustrative timing diagrams for sequencing of safety and trigger signals for a valid command, referenced in the main routine of FIGS. 19–22.

FIG. 23A graphically illustrates a valid user command that initiates acceleration of the motor 24 and actuation of the solenoid 26 of FIG. 1 over a time period of "t0" to "t7". At time "t1", an enabling event, depicted as depression of the safety, provides power to the control system. The "Power or Safety" remains on throughout the depicted time scale to time "t7". At time "t2", trigger signal is received, which also remains present throughout the remainder the graph, representing the tool placed against the workpiece followed by depression of the trigger. Also at time "t2", the motor command ("Motor Signal") begins.

Figure 23B:
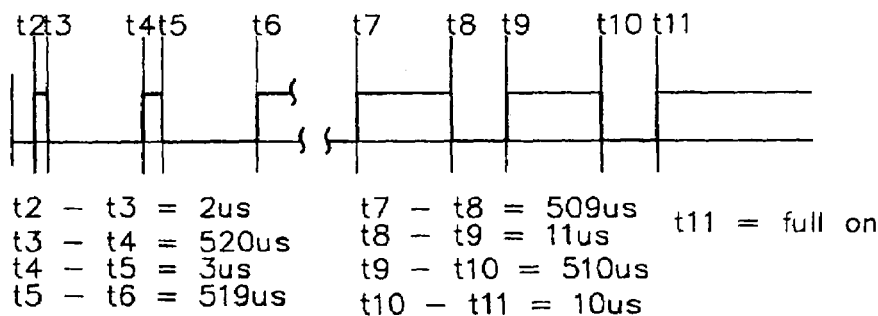

The portion of the motor signal between times "t2" and "t3" of FIG. 23A are depicted in greater detail in FIG. 23B, which shows the soft start portion of the motor signal. In particular, the PWM motor signal begins with an on time of 2 $\mu$sec and off time of 510 $\mu$sec, incrementing each cycle by 10 $\mu$sec until reaching a full command of 510 $\mu$sec on time and 10$\mu$ off time. It will be appreciated that other approaches to soft starting the motor may be implemented as well as omitting soft start.

Returning to FIG. 23A, with the motor signal beginning at time "t2", the parameter of rotational speed of the flywheel and motor is sensed ("motor speed"). The initial value of motor speed at time "t2" may be nonzero if the flywheel has residual kinetic energy from a previous driving cycle. At about time "t3", the sensed speed enters the lowest speed of the speed range available for actuation. At time "t5", the sensed speed reaches the target speed, whereupon several changes occur. The motor command is deactivated. In addition, a solenoid signal commands actuation, transferring the kinetic energy from the flywheel to the linearly moving driver to the fastener as shown by the decreasing motor signal. At time "t6", the motor speed is sensed at having reduced to a threshold indicating the desired actuation, and thus the solenoid signal is deactivated.

Figure 23C:
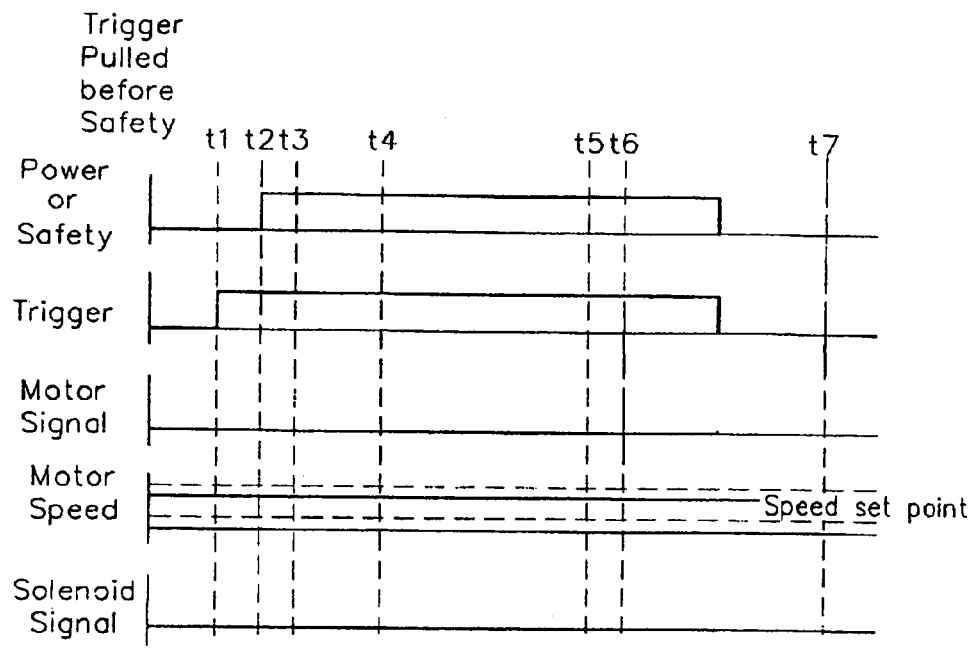
Figure 23D:
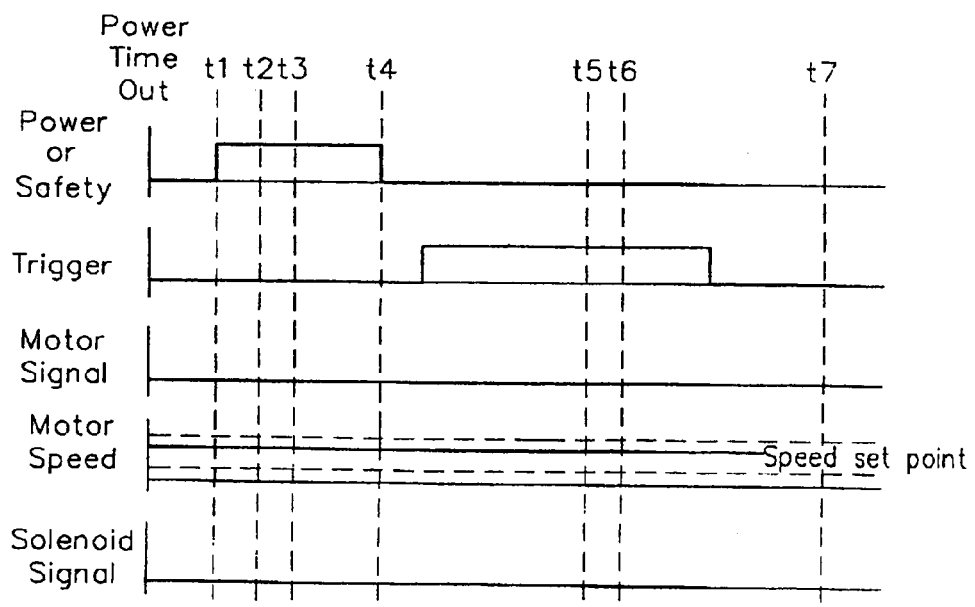
Figure 23E:
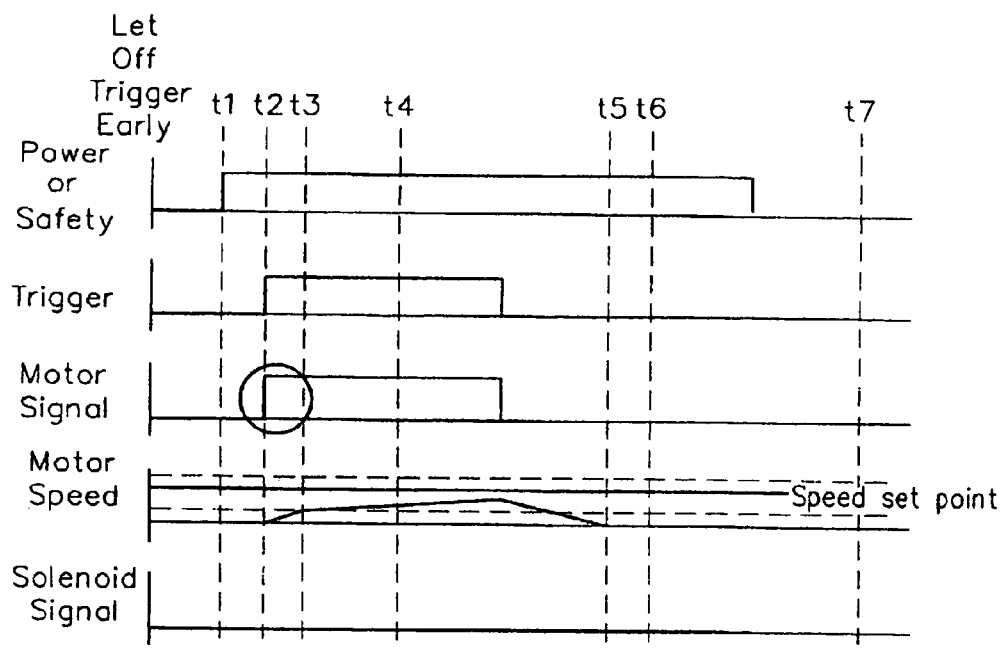
Figure 23F:
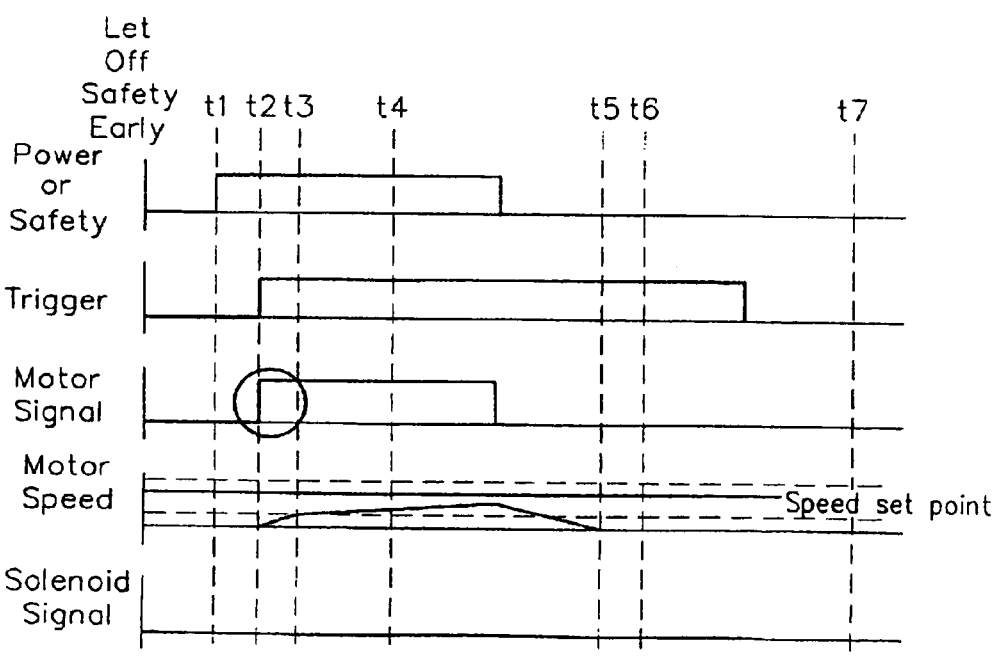

FIGS. 23C–23F depict instances where an invalid command is given, resulting in no actuation of the tool. FIG. 23C presents a trigger signal at time "t1" that precedes the safety signal at time "t2", which in the illustrative embodiment precludes activating the motor and actuating the solenoid. FIG. 23D presents a safety depressed at time "t1", but the safety signal reaches a time-out at time "t4" before the trigger signal is received, thus precluding activation and actuation. FIG. 23E presents a safety signal at time "t1" and a trigger signal at time "t2", which is the required sequence and within the time-out value for the safety. Although the safety signal remains present, the trigger signal is withdrawn after time "t4" before the motor speed has reached the speed target ("speed set point"). Without a valid command being removed, the motor signal is removed and actuation does not occur. FIG. 23F presents a situation similar to FIG. 23E except that the safety signal is the one that is removed after time "t4" before the motor speed reaches the speed target. Again, the motor signal is removed and actuation does not occur.

Figure 24A:
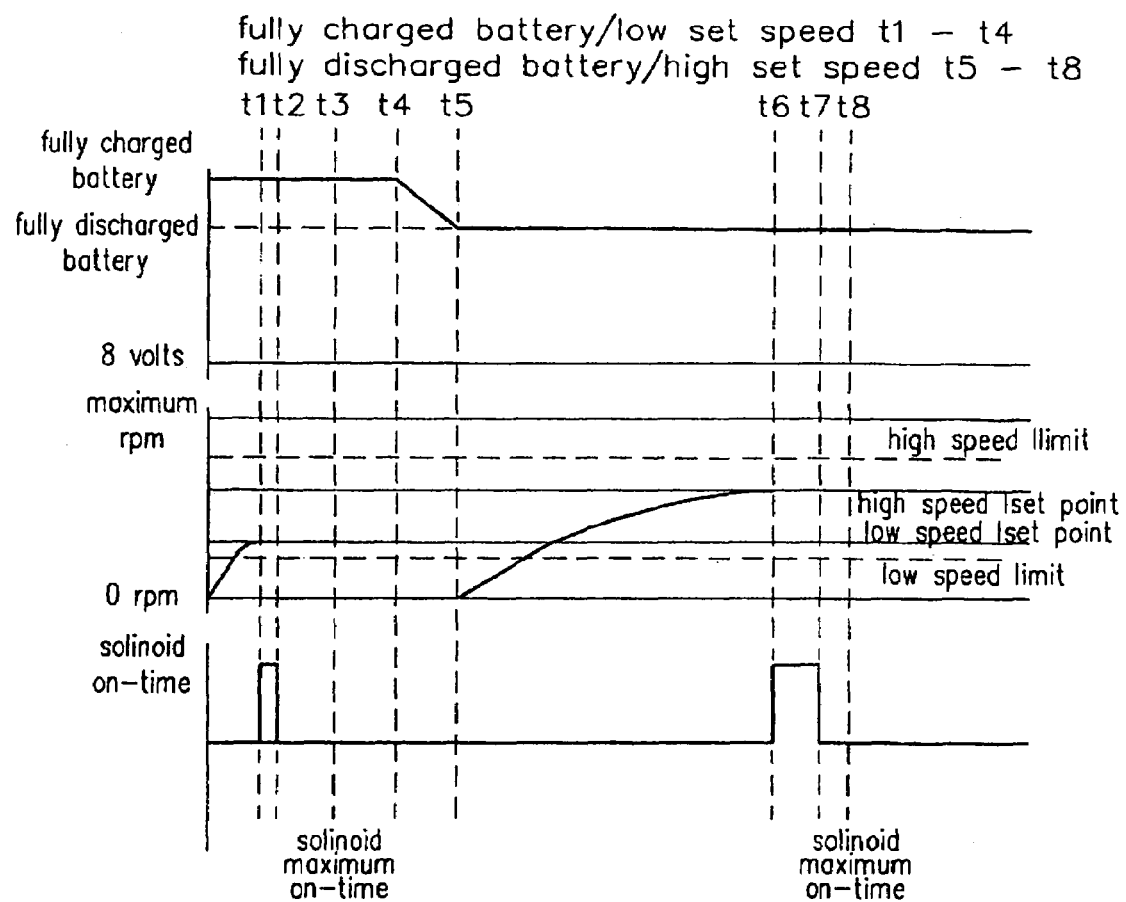
FIG. 24A–24B present illustrative timing diagrams for motor activation and solenoid actuation in response to variations in battery charge and clutch wear, referenced in the main routine of FIGS. 19–22.
Figure 24B:
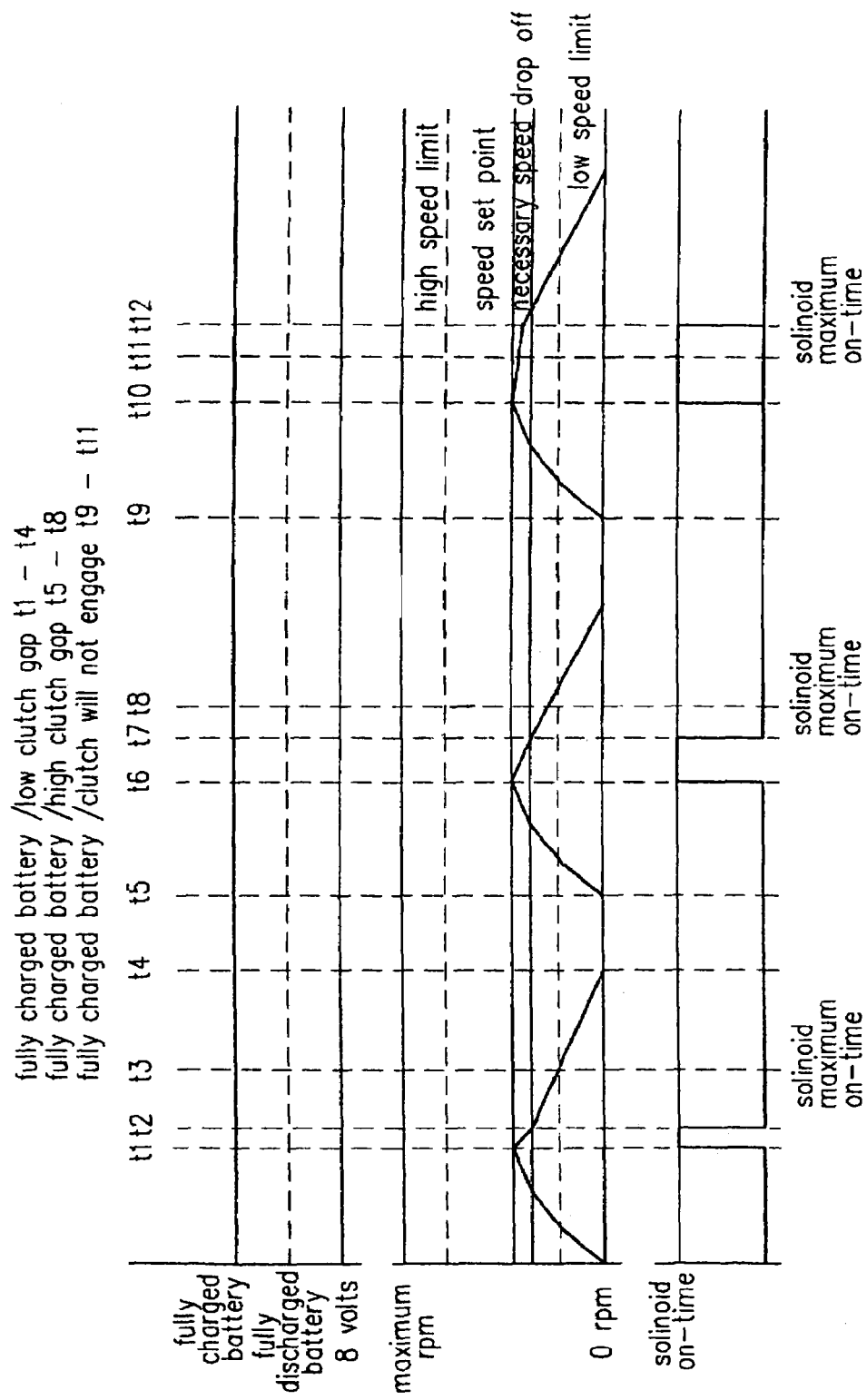

FIGS. 24A–24B illustrate the adaptability of the control system to a wide operating range of fastener types and battery charge. FIG. 24A graphically illustrates a scenario where the flywheel accelerates rapidly with a fully charged battery and a low speed set point for the speed target. Thus at time "t1" the low speed set point is reached and the solenoid signal is present for a relatively short period until time "t2". Then, between time "t4" and "t5", the battery voltage is shown as reaching a fully discharged level and the tool having been set to a high-speed set point. Thus, the acceleration of the motor speed from time "t5" to time "t6" to the high-speed set point takes longer. Moreover, the solenoid signal is required to be present for a longer period from time "t6" to "t7" by actuating more slowly with a lower solenoid signal.

FIG. 24B illustrates a feature of the control system to accommodate increased tolerance within the clutch components due to wear or manufacturing variation yet still detect a failure condition. In the first trace representing a clutch with a low gap, the motor accelerates the flywheel to the target speed at time "t1". Then, a brief solenoid signal starts at time "t1". After a brief period, the flywheel has slowed to the necessary speed drop off and the solenoid signal is deactivated, having provided the necessary amount of kinetic energy to the driver. In the second trace representing a clutch with a high gap, the motor accelerates the flywheel to the target speed at time "t6", prompting the solenoid signal to start. The solenoid signal last for a longer period than the first trace. At time "t7", the necessary speed drop off is reached and the solenoid signal is deactivated. The third trace represents a clutch that fails to engage. At time "t10", the motor has accelerated the flywheel to the target speed and the solenoid signal starts. With the clutch failing to engage, the motor speed drops off slowly, still higher than the expected value at time "t11". Then, at time "t12", the clutch time-out value is reached, indicating the failure, and the solenoid signal is discontinued.

Figure 25:
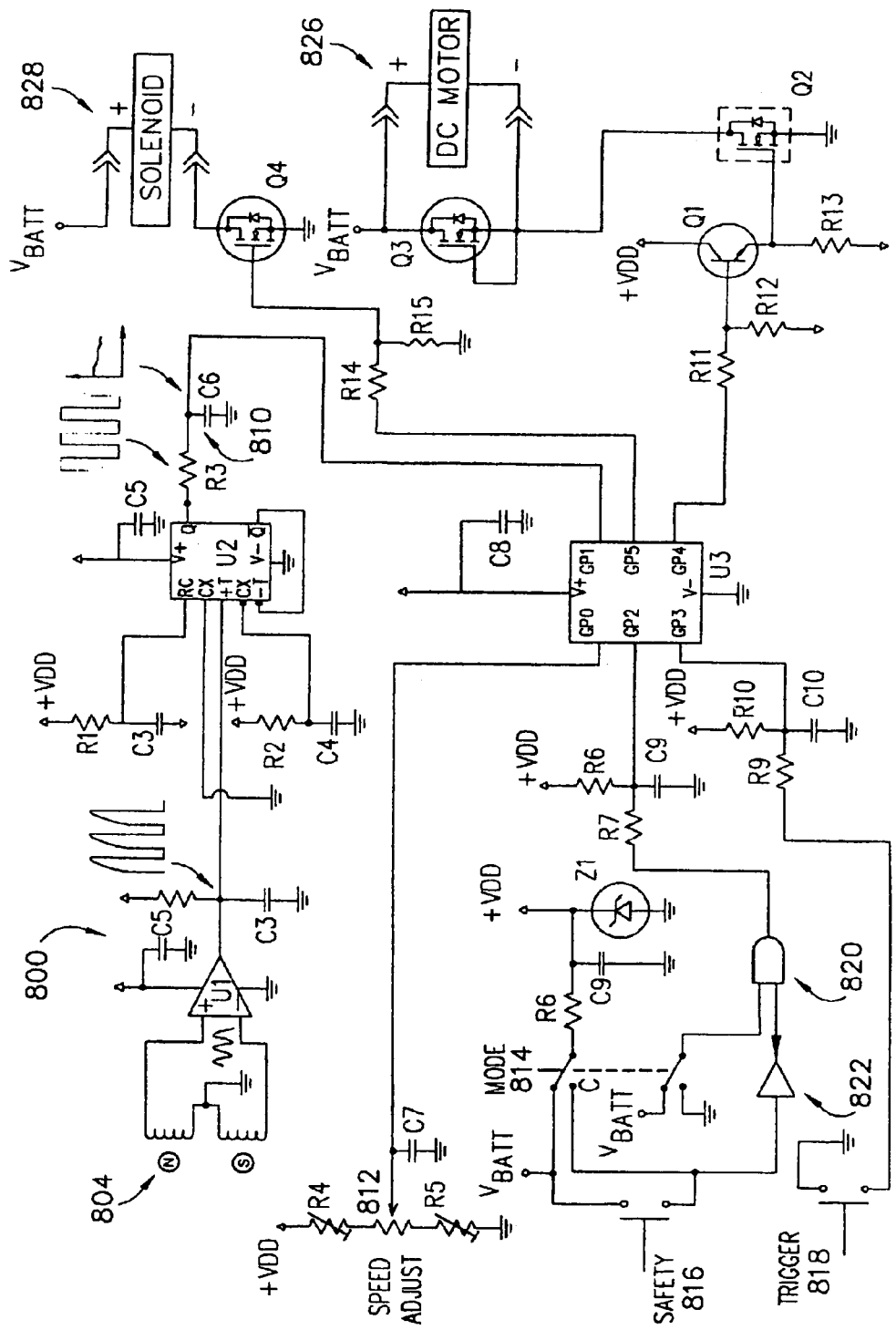
FIG. 25 presents an illustrative control circuit for the control system of FIG. 18.

FIG. 25 depicts an exemplary control circuit 800 for a flywheel operated hand tool, such as the nailing tool 10 of FIG. 1 that advantageously provides selectable continuous or intermittent modes and economical speed sensing.

A speed sensor 802 is picks up alternating north and south magnetic fields 804 on a ring magnet with an inductive transducer 806. In particular, a series pair of coils 808 have their shared node is grounded and their opposite ends connected to a differential amplifier, or comparator U1, such as model no. TA75S393F. Thus, as each pair of fields 804 of the 32 alternating poles are encountered, the push-pull arrangement or differential arrangement enhances signal integrity and noise immunity of the differential speed signal of about 10–15 mV. The comparator U1 is biased between power supply VDD and ground. The positive bias is also coupled to ground via capacitor C1 suppress high frequency noisy disturbances from the power supply.

The output node of the comparator U1 is coupled to ground via a capacitor C2 to rectify and low pass filter the differential speed output that is passed to the +T input of a monostable multivibrator (one shot) U2, such as model no. MM74HC4538 by Fairchild Semiconductor Corporation. The one shot U2 is an integrated circuit that, when triggered, produces an output pulse width that is independent of the input pulse width, and can be programmed by an external resistor-capacitor (RC) network to set the pulse width. To that end, the RC input of the one shot U2 is coupled to the common node of a series resistor R1 and capacitor C3, the series coupled between power supply VDD and ground, respectively. The inverted input CS of the one shot U2 is coupled to the common node of a series resistor R2 and capacitor C4, the series coupled between power VDD and ground, respectively. The inverted output $\overline{Q}$ of the one shot U2 is connected to the inverted input −T. The bias V+ of the one shot U2 is coupled to power supply VDD and to ground via capacitor C5. Thus configured, the one shot U2 outputs at noninverted output Q a series of pulses, the spacing between pulses being a function of the rate that the poles of ring magnet pass by the speed transducer 808.

The pulse train at output Q of one shot U2 is connected to a node 810 via a resistor R3. The node 810 is also coupled to ground via capacitor C6. Thus, the signal at node 810 is low pass filtered, creating a near DC signal whose amplitude is related to rate of pulses. Thus, the sensed speed signal has been converted to a form suitable for digital processing.

A controller U3, such as an 8-pin RISC microprocessor performs the digital processing, model PIC12C671. The analog input GP1 of the controller U3 receives the near DC signal from node 810. This near DC signal is compared to a speed target reference signal at analog input GP0. The controller U3 changes the analog reference signal into a digital signal to be compared to the digitized speed signal with a resolution of one bit. The speed target reference signal is produced by preset speed adjust range formed by a voltage divider of trimmable resistors R4 and R5 coupled between power supply VDD and ground. Inserting an infinitely variable potentiometer 812 between resistors R4 and R5 advantageously provides a user speed adjustment. The pick off point of the potentiometer 812 is coupled to the analog input GP0 and also coupled to ground via capacitor C7 for noise suppression. It will be appreciated that the resistors R4 and R5 may be selected for a desired speed range within which the potentiometer 812 selects a target speed. The voltage thus produced at analog input GP0 may advantageously be selected for a desired voltage level corresponding to a target speed. When enabled by a safety signal at input GP2, the processor U3 awaits a trigger signal at input GP3, as described above in the timing diagrams of FIG. 23A–23F before producing a motor signal at output GP5 and thereafter a solenoid actuation signal at output GP4.

The user initiates these actions by selecting a mode, either continuous or intermittent, at mode select switch 814, enabling the tool with safety switch 816, and then commanding the driving of a fastener with a trigger switch 818.

The safety signal is received in either continuous or intermediate mode, which affects the manner of operation of processor U3. Specifically, in continuous mode, switch 814 couples battery voltage VBATT to a resistor R6 whose value is selected to scale the battery voltage to the desired voltage VDD for the control system 800. The resulting power supply voltage VDD is further regulated by being coupled to ground via the parallel combination of a capacitor C8 and zener diode Z1. Thus, in continuous mode, the control system remains enabled, awaiting a safety and trigger signal to initiate the tool.

To that end, the mode switch 814 in continuous mode also couples the battery voltage to a first input of an AND gate 820, such as an SN74AHC1G08. The other input to the AND gate 820 receives battery voltage VBATT when the safety switch 816 is closed, inverted by inverter 822, such as an SN74AHC1G04. The output of the AND gate 820 controls the input GP2 via a biasing circuit 824. In particular, the output of the AND gate 820 is connected to input GP2 via resistor R7. The input GP2 is also coupled to power supply VDD via a resistor R8 and to ground via capacitor C9. When the trigger switch is closed, ground is coupled the input GP3 of the processor U3 via resistor R9. The input GP3 is connected to power supply VDD via resistor R10 and to ground via a capacitor C10.

When the mode switch 812 is in intermittent mode, the resistor R6 is connected to battery voltage VBATT when the safety switch 816 is closed. Also, the first input of the AND gate 820 is connected to ground.

The processor U3 commands a DC motor 826 with a motor signal at output GP4 that is coupled via resistor R11 to the base of a buffer, depicted as a small signal transistor Q1 such as a 2N4401. The base is also coupled to ground via resistor R12 to ensure that the transistor will be off if voltage is not applied to the base. The collector is connected to power supply VDD. The emitter is also connected to the base of a rectifier Q2, such as an IRL3803 that advantageously has a low RDS (on) characteristics minimizing energy dissipation, that is heat shielded. The emitter is also coupled to ground via resistor R13 to ensure that rectifier Q2 if off when not supplied with a signal. The turned-on rectifier Q2 thereby couples to ground a negative terminal respectively of a DC motor 826, a MOSFET configured as a diode Q3 (such as a model MTD20N03HDL) that advantageously has a high current carrying capacity in a small package. A positive terminal respectively of the diode Q3 and the DC motor 826 are coupled to battery voltage VBATT. Thus, the DC motor 826 is activated when rectifier Q2 closes.

The processor U3 commands a solenoid 828 with a solenoid signal at output GP5 that is coupled via resistor R14 to the base of a MOSFET configured as diode Q4 (such as a model MTD20N03HDL). The base is also coupled to ground via resistor R15 to ensure that the transistor will be off if voltage is not applied to the base. The rectifier Q4 has a negative terminal coupled to ground and a positive terminal coupled to a negative terminal of the solenoid 828. The positive terminal of the solenoid 828 is coupled to battery voltage VBATT, thus solenoid 828 activates when rectifier Q4 is closed by the solenoid signal. The rectifier Q4 advantageously withstands the electrical current spikes associated with inductive loads of solenoids.

Figure 26:
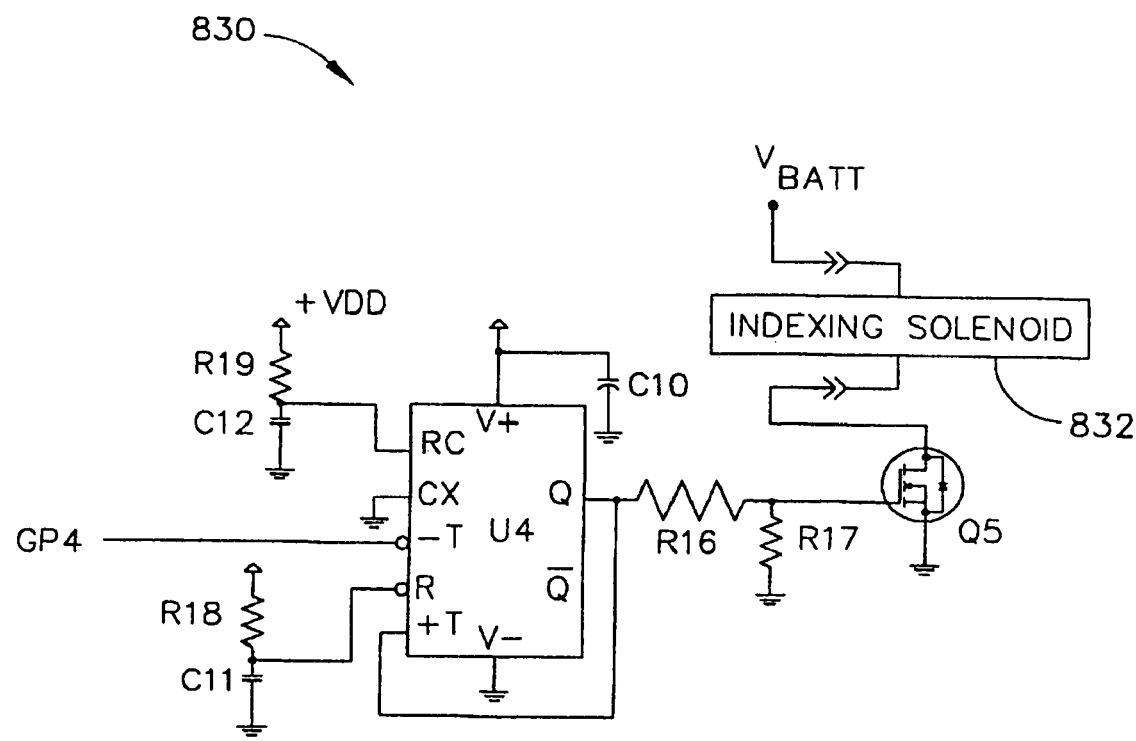
FIG. 26 presents an indexing control circuit for the control circuit of FIG. 25.

FIG. 26 presents an index circuit 830 for providing an electrical index signal, thereby avoiding the additional complexity of pneumatic index approaches. Moreover, the index circuit advantageously uses a one shot U4 that is part of the same package as one shot U2. The index circuit 830 is triggered by the solenoid signal from GP4 of the processor U3 to an inverted −T input, as would be appropriate for a solenoid that is triggered on a falling edge of a solenoid signal rather than a rising edge. The one shot U4 is configured with a positive bias V+ to power supply VDD and also coupled to ground via capacitor C10. A negative bias V− is grounded. A noninverted output Q is connected to input +T to place the device into a non-retriggerable, monostable mode of operation. An inverted input R is coupled to a shared node of a series combination of a resistor R18 and capacitor C11 that are connected across power supply VDD and ground, providing a reset RC network to hold the device in reset until power supply VDD is up and stable. Similarly, an input RC of the one shot U4 sets up the output timing, i.e. time the output pulse is high. In particular, the input RC is coupled to a shared node of a series combination of a resistor R19 and capacitor C12 connected between power supply VDD and ground, respectively. The one shot U4 has an output pulse of appropriate duration and delay from the solenoid signal to advance the next fastener after the previous fastener is driven. The index pulse from output Q is given an appropriate voltage by passing through a series resistor R16 to a base of a rectifier Q5 (a MOSFET configured as a diode such as a model MTD20N03HDL. The base is also coupled to ground through a resistor R17 to ensure that rectifier Q5 is off when no voltage is applied. A negative terminal of the rectifier Q5 is grounded. A positive terminal rectifier Q5 is connected to a negative terminal of an indexing solenoid 832. A positive terminal of the indexing solenoid 832 is connected to battery voltage VBATT. Thus, when the indexing signal closes the rectifier Q5, the indexing solenoid 832 is activated.

In use, a user loads the magazine 42 of the nailing tool 10 with a strip of fasteners, and installs a charged battery 22. The tool is in a mode, such as Intermittent, conserving battery power by accelerating a flywheel each time that a fastener is to be dispensed or driven. As the nose assembly 36 is placed against a workpiece, closing a safety device 34, the safety mechanical linkage 38 contacts a highly reliable thin film safety switch 52, powering the control module 18. A trigger 30 is depressed, activating another highly reliable thin film trigger switch 50 via a trigger mechanical linkage 32. If the safety and trigger switches are actuated within appropriate time intervals and sequence (e.g., safety depressed and held no more than 3 seconds prior to trigger), then the processor U3 calculates a target speed for the flywheel set as appropriate for the fastener drive assembly 16 and/or an appropriate setting for the fastener and workpiece. As the flywheel accelerates, the speed signal from a noncontact speed sensor 60 is compared to the target speed. Once reached, the motor 24 is de-energized and then a solenoid actuation signal couples a clutch to the flywheel 28 to impart kinetic energy to a linearly moving fastener driver 68. The processor U3 uses a reduction threshold to determine when the flywheel 28 has imparted an appropriate amount of kinetic energy, thereafter allowing the flywheel 28 to continue spinning with any remaining energy available for the next cycle. By monitoring flywheel speed, fault conditions are detected such as a slow motor acceleration that could be due to low battery voltage, motor degradation or a stuck clutch. Similarly, by detecting an actuation time-out, the failure of the clutch drive assembly 64 to engage is detected, preventing jamming of the tool 10 if attempting to cycle again.

By virtue of the foregoing, a portable tool 10 provides a consistent drive in a single stroke, yet efficiently uses electrical power from the battery 22 without detrimental surges by using a DC motor 24 to accelerate a flywheel 28. Moreover, consistent drives are ensured across a range of battery voltages and component tolerance variations (e.g., clutch wear). The consistent rotary sensing and control of a rotary member (e.g., flywheel 28) has application more broadly to hand tools in accurately and robustly setting a desired speed.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. For example, aspects of the invention are applicable to other sources of power, such as corded power tools or pneumatic power tools. As another example, although a programmed approach is described herein, it will be appreciated that digital logic or analog controls may be used.

As a further example, although a noncontact speed sensor is disclosed, applications of the present invention may include other types of speed sensing. For instance, an optical encoding approach may be used, weigan sensor, variable reluctance sensors, Hall effect sensors, feedback from the motor such as a tachometer signal, and other techniques.

As yet a further example, the described control circuit 800 employs a battery voltage VBATT having a nominal value with resistors and a zener diode Z1 being used to step down the battery voltage to the power supply voltage VDD. However, it will be appreciated that a power supply (e.g., a switching power supply) capable of regulating the voltage to the integrated circuit components may be used while providing a battery voltage signal to a processor. Thereby the processor may adapt its command, timing, and other features to accommodate a wider range of battery voltage, thus extending service life. For instance, a processor having additional available inputs such as an 18-pin processor, model PIC16C71 may be used.

As an addition example, a speed adjustment circuit may employ other types of voltage references, such as a sized digital resistor. In addition, the processor may calculate or lookup in a table a digital reference against which the sensed speed signal is compared.

As another example, although a specific safety and trigger sequence is described, other sequences and time-out schemes may be employed. Moreover, even a single trigger scheme without a safety may be employed.

What is claimed is:

1. A control module for a hand tool powered by DC power having a rotary member;
comprising:
    a target speed adjustment circuit operable to electronically communicate a target speed signal, wherein said target speed signal represents a target speed for the rotary member;
    a speed sensor circuit operable to electronically communicate a rotary speed signal, wherein said rotary speed signal represents a rotary speed of the rotary member, wherein said rotary speed is determined by a sensor;
    a trigger circuit electronically operable to communicate a trigger signal, wherein said trigger signal represents engagement of a trigger by a user; and
    a controller having a plurality of inputs and outputs; wherein the inputs of the controller comprise input signals comprising the target speed signal, the rotary speed signal, and the trigger signal; wherein the controller is operably configured to command the rotary member with electronic communication of a first command signal in response to a function comprising a first function of the input signals.

2. The control module of claim 1, wherein the controller is a microprocessor.

3. The control module of claim 1, wherein the controller is operably configured to command a clutch mechanism with electronic communication of a second command signal in response to a function comprising a second function of the input signals;
- wherein the clutch mechanism is operable to mechanically impart kinetic energy of the rotary member to a driving mechanism.

4. The control module of claim 3, said clutch mechanism comprising a solenoid.

5. The control module of claim 1, wherein the trigger circuit further comprises:
- a mechanical control for receiving a user input for operation of the hand tool; and
- a thin film switch in physical communication with the mechanical control and in electrical communication with the controller.

6. The control module of claim 1, wherein the first command signal is received by a direct current electric motor, wherein the direct current electric motor is in mechanical communication with the rotary member.

7. The control module of claim 1, further comprising a battery.

8. The control module of claim 1, wherein the target speed adjustment circuit further comprises a variable potentiometer, wherein the variable potentiometer is operable to vary the target speed signal.

9. The control module of claim 8, wherein the variable potentiometer is operable to be varied by a speed adjustment knob.

10. The control module of claim 1, further comprising a mode circuit electronically operable to communicate a mode signal, wherein the mode signal represents a desired mode of constancy of rotation of the rotary member; wherein the mode circuit comprises a mode selection switch, wherein said mode selection switch is responsive to a user's mode selection between continuous and non-continuous mode, wherein the mode signal further represents a user's mode selection of desired mode of constancy of rotation of the rotary member, wherein the inputs of the controller further comprise an input signal comprising a mode signal, wherein the controller is responsive to the mode signal by commanding the rotation of the rotary member in accordance with the user's mode selection.

11. The control module of claim 1, further comprising a safety circuit electronically operable to communicate a safety signal, wherein said safety signal is operable to prevent kinetic energy from being imparted from the rotary member; wherein the inputs of the controller further comprise an input signal comprising the safety signal, wherein the controller is configured to respond to a safety signal by commanding the prevention of the impartation of kinetic energy from the rotary member.

12. The control module of claim 1, further comprising a safety circuit electronically operable to communicate a safety signal, wherein said safety signal is operable to allow kinetic energy to be imparted from the rotary member; wherein the inputs of the controller further comprise an input signal comprising the safety signal, wherein the controller is configured to respond to a safety signal by allowing the impartation of kinetic energy from the rotary member.

13. The control module of claim 12, further comprising:
- a mechanical safety control for receiving a safety input for detecting one or more safety conditions; and
- a safety thin film switch in physical communication with the mechanical safety control and in electrical communication with the controller.

14. The control module of claim 13, wherein the mechanical safety control is responsive to pressure on a safety sensor.

15. The control module of claim 12, wherein the safety signal has a limited temporal duration, wherein said temporal duration is preset at a safety time-out value, wherein the safety signal ceases at the expiration of the temporal duration at the safety time-out value.

16. The control module of claim 1, wherein the controller is responsive to one or more enabling conditions, wherein the controller is operable to command the impartation of kinetic energy from the rotary member in the presence of said one or more enabling conditions.

17. The control module of claim 16, wherein said one or more enabling conditions comprise:
- a trigger signal;
- a safety signal; and
- a rotary speed signal, wherein said rotary speed signal is approximately equal to a target speed signal.

18. The control module of claim 16, wherein the controller is operable to prevent the impartation of kinetic energy from the rotary member in the absence of one or more enabling conditions.

* * * * *

(12) EX PARTE REEXAMINATION CERTIFICATE (7502nd)
United States Patent
Adams et al.

(10) Number: US 6,974,061 C1
(45) Certificate Issued: May 11, 2010

(54) CONTROL MODULE FOR FLYWHEEL OPERATED HAND TOOL

(75) Inventors: Shane Adams, Lebanon, OH (US); Conrad Garvis, Mason, OH (US); Richard Leimbach, Cincinnati, OH (US)

(73) Assignee: Lasalle Bank National Association, Cincinnati, OH (US)

Reexamination Request:
No. 90/008,833, Sep. 4, 2007

Reexamination Certificate for:
Patent No.: 6,974,061
Issued: Dec. 13, 2005
Appl. No.: 10/896,813
Filed: Jul. 22, 2004

Related U.S. Application Data

(62) Division of application No. 10/027,767, filed on Dec. 20, 2001, now abandoned.
(60) Provisional application No. 60/258,022, filed on Dec. 22, 2000.

(51) Int. Cl.
*B25C 1/06* (2006.01)
*B25C 1/00* (2006.01)

(52) U.S. Cl. .......................... 227/2; 227/131
(58) Field of Classification Search .......... None
See application file for complete search history.

(56) References Cited

U.S. PATENT DOCUMENTS

| | | | |
|---|---|---|---|
| 4,129,240 A | * | 12/1978 | Geist ............... 227/8 |
| 5,440,215 A | * | 8/1995 | Gilmore .............. 318/432 |
| 5,443,196 A | | 8/1995 | Burlington |
| 5,605,268 A | | 2/1997 | Hayashi et al. |
| 5,732,870 A | * | 3/1998 | Moorman et al. ...... 227/130 |
| 5,738,177 A | * | 4/1998 | Schell et al. ........ 173/178 |
| 5,747,953 A | | 5/1998 | Philipp |
| 5,772,096 A | | 6/1998 | Osuka et al. |

* cited by examiner

*Primary Examiner*—Jeffrey L. Gellner

(57) ABSTRACT

A control module advantageously reduces cost and enhances reliability, design flexibility, ease of assembly, and performance of a flywheel operated hand tool. The control module includes a thin film printed circuit with non-contact speed sensing of a flywheel to more accurately set the target speed and control transfer kinetic energy thereof to a fastener, achieving a desired depth regardless of variations in component performance and battery voltage. The printed circuit also includes long service life thin film switches for responding to trigger and safety inputs. Furthermore, the control module responds to a user speed selection and to preset speed selection ranges to reconfigure the controls as appropriate to constraints of a fastener drive assembly and to user preferences.

At the time of issuance and publication of this certificate, the patent remains subject to pending reissue application number 11/955,966 filed Dec. 13, 2007. The claim content of the patent may be subsequently revised if a reissue patent issues from the reissue application.

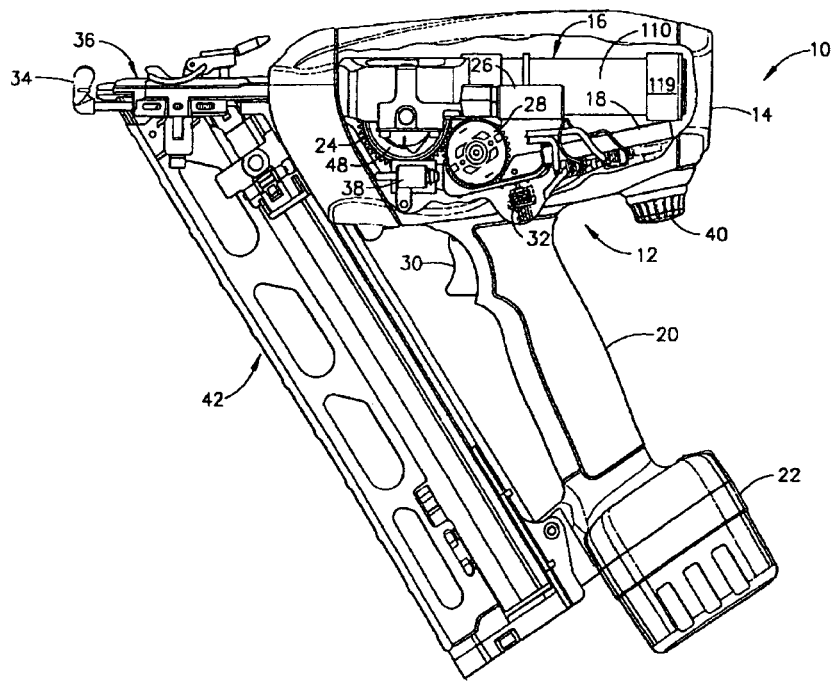

US 6,974,061 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 17, lines 34–60:

A controller U 3, such as an 8-pin RISC microprocessor performs the digital processing, model PIC12C671. The analog input GP 1 of the controller U 3 receives the near DC signal from node 810. This near DC signal is compared to a speed target reference signal at analog input GP 0. The controller U 3 changes the analog reference signal into a digital signal to be compared to the digitized speed signal with a resolution of one bit. The speed target reference signal is produced by preset speed adjust range formed by a voltage divider of trimmable resistors R 4 and R 5 coupled between power supply VDD and ground. Inserting an infinitely variable potentiometer 812 between resistors R 4 and R 5 advantageously provides a user speed adjustment. The pick off point of the potentiometer 812 is coupled to the analog input GP 0 and also coupled to ground via capacitor C 7 for noise suppression. It will be appropriated that the resistors R 4 and R 5 may be selected for a desired speed range within which the potentiometer 812 selects a target speed. The voltage thus produced at analog input GP 0 may advantageously be selected for a desired voltage level corresponding to a target speed. When enabled by a safety signal at input GP 2, the processor U 3 awaits a trigger signal at input GP 3, as described above in the timing diagrams of FIG. 23A–23F before producing a motor signal at output GP [5] *4* and thereafter a solemoid actuation signal at output GP [4] *5*.

AS A RESULT OF REEXAMINATION, IT HAS BEEN DETERMINED THAT:

Claims 1, 2 and 7 are cancelled.

Claims 3, 5, 6, 8, 10, 11, 12 and 16 are determined to be patentable as amended.

Claims 4, 9, 13, 14, 15, 17 and 18, dependent on an amended claim, are determined to be patentable.

New claims 19–27 are added and determined to be patentable.

3. [The control module of claim 1,] *A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals;* wherein the controller is operably configured to command a clutch mechanism with electronic communciation of a second command signal in response to a function comprising a second function of the input signals; wherein the clutch mechanism is operable to mechanically impart kinetic energy of the rotary member to a driving mechanism.

5. [The control module of claim 1,] *A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals;* wherein the trigger circuit further comprises: a mechanical control for receiving a user input for operation of the hand tool; and a thin film switch in physical communication with the mechanical control and in electrical communication with the controller.

6. [The control module of claim 1,] *A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals;* wherein the first command signal is received by a direct current electric motor, wherein the direct current electric motor is in mechanical communication with the rotary member.

8. [The control module of claim 1,] *A control module for a hand tool powered by DC power having a rotary member; comprising: a target speed adjustment circuit operable to* electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals;* wherein the target speeed adjustment circuit further comprises a variable potentiometer, wherein the variable potentiometer is operable to vary the adjustable target speed signal and *where said adjustable target speed signal comprises a preset target speed range within which a user may adjust said target speed of said rotary member.*

10. [The control module of claim 1,] *A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals;* further comprising a mode circuit electronically operable to communicate a mode signal, wherein the mode signal represents a desired mode of constancy of rotation of the rotary member; wherein the mode circuit comprises a mode selection switch, wherein said mode selection switch is responsive to a user's mode selection between continuous and non-continuous mode, wherein the mode signal further represents a user's mode selection of desired mode of constancy of rotation of the rotary member, wherein the inputs of the controller further comprise an input signal comprising a mode signal, wherein the controller is responsive to the mode signal by commanding the rotation of the rotary member in accordance with the user's mode selection.

11. [The control module of claim 1,] *A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals;* further comprising a mode circuit electronically operable to communicate a mode signal, wherein the safety signal is operable to prevent kinetic energy from being imparted from the rotary member; wherein the inputs of the controller further comprise an input signal comprising the safety signal, wherein the controller is configured to respond to a safety signal by commanding the prevention of the impartation of kinetic energy from the rotary member.

12. [The control module of claim 1,] *A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals;* further comprising a safety circuit electronically operable to communicate a safety signal, wherein the safety signal is operable to allow kinetic energy to be imparted from the rotary member; wherein the inputs of the controller further comprise an input signal comprising the safety signal, wherein the controller is configured to respond to a safety signal by allowing the impartation of kinetic energy from the rotary member.

16. [The control module of claim 1,] *A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a* first function of the input signals; wherein the controller is responsive to one or more enabling conditions, wherein the controller is operable to command the impartation of kinetic energy from the rotary member in the presence of said one or more enabling conditions.

19. A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals; wherein said rotary member further comprises a ring magnet comprising a plurality of radially arrayed pairs of magnetic poles and wherein the rotational speed of said rotary member is directly sensed by a transducer sensing alternating north and south magnetic fields during rotation of said rotary member.

20. The control module of claim 3, wherein said clutch mechanism comprises a conical clutch plate having a conical friction surface and wherein said rotary member comprises a conical cavity for receiving said conical friction surface upon engagement of the clutch mechanism.

21. The control module of claim 20, wherein said control module for a hand tool comprises a control module for a hand held fastener driving tool.

22. The control module of claim 21, wherein said adjustable target speed signal comprises a preset target speed range within which a user may adjust said target speed of said rotary member to compensate for at least one of variations in a workpiece and a desired depth of fastener insertion.

23. A control module for a hand tool powered by DC power having a rotary member; comprising: a target speed adjustment circuit operable to electronically communicate an adjustable target speed signal, wherein said adjustable target speed signal represents a target speed for the rotary member and that is representative of user target speed input; a speed sensor circuit operable to electronically communicate a rotary speed signal, wherein said rotary speed signal represents a rotary speed of the rotary member, wherein said rotary speed is determined by a sensor; a trigger circuit electronically operable to communicate a trigger signal, wherein said trigger signal represents engagement of a trigger by a user; and a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals; wherein said target speed of said rotary member is independent of user displacement of said trigger.

24. The control module of claim 20, wherein said driving mechanism comprises a linearly moving fastener driver for driving a fastener into a workpiece.

25. A control module for a hand held fastener driving tool powered by DC power having a rotary member; comprising:
a target speed adjustment circuit operable to electronically communicate an adjustable target speed signal, wherein said adjustable target speed signal represents a target speed for the rotary member and that is representative of user target speed input;
a speed sensor circuit operable to electronically communicate a rotary speed signal, wherein said rotary speed signal represents a rotary speed of the rotary member, wherein said rotary speed is determined by a sensor;
a trigger circuit electronically operable to communicate a trigger signal, wherein said trigger signal represents engagement of a trigger by a user; and
a controller having a plurality of inputs and outputs; wherein the inputs of the controller comprise input signals comprising the adjustable target speed signal, the rotary speed signal, and the trigger signal; wherein the controller is operably configured to command the rotary member with electronic communication of a first command signal in response to a function comprising a first function of the input signals; wherein said controller is operably configured to command a clutch mechanism with electronic communication of a second command signal in response to a function comprising a second function of the input signals; and wherein the clutch mechanism is operable to mechanically impart kinetic energy of the rotary member to a driving mechanism.

26. The control module of claim 25, wherein said clutch mechanism comprises a conical clutch plate having a conical friction surface and wherein said rotary member comprises a conical cavity for receiving said conical friction surface upon engagement of the clutch mechanism.

27. The control module of claim 26, wherein said rotary member further comprises a ring magnet comprising a plurality of radially arrayed pairs of magnetic poles and wherein the rotational speed of said rotary member is directly sensed by a transducer sensing alternating north and south magnetic fields during rotation of said rotary member.

* * * * *